AUTOMATIC TELEPHONE EXCHANGE SYSTEMS

Filed Aug. 3, 1950 15 Sheets-Sheet 1

THOMAS H. FLOWERS
BY Hall & Houghton
Attorneys

THOMAS H. FLOWERS
By Hall & Houghton
Attorneys

THOMAS H. FLOWERS
By Hall & Houghton
Attorneys

AUTOMATIC TELEPHONE EXCHANGE SYSTEMS

Filed Aug. 3, 1950 15 Sheets-Sheet 4

THOMAS H. FLOWERS

By Hall & Houghton

Attorneys

THOMAS H. FLOWERS
By Hall & Houghton
Attorneys

THOMAS H. FLOWERS

By Hall & Houghton

Attorneys

Nov. 13, 1956 T. H. FLOWERS 2,770,678

AUTOMATIC TELEPHONE EXCHANGE SYSTEMS

Filed Aug. 3, 1950 15 Sheets-Sheet 7

THOMAS H. FLOWERS

By Hall & Houghton

Attorneys

THOMAS H. FLOWERS
By Hall & Haughton
Attorneys

THOMAS H. FLOWERS
By Hall & Houghton
Attorneys

THOMAS H. FLOWERS
By Hall & Houghton
Attorneys

THOMAS H. FLOWERS
By Hall & Houghton
Attorneys

THOMAS H. FLOWERS
By Hall & Houghton
Attorneys

THOMAS H. FLOWERS,
INVENTOR
BY Hall & Houghton
ATTORNEY

Nov. 13, 1956 T. H. FLOWERS 2,770,678

AUTOMATIC TELEPHONE EXCHANGE SYSTEMS

Filed Aug. 3, 1950 15 Sheets-Sheet 14

THOMAS H. FLOWERS,
INVENTOR

BY Hall & Houghton
ATTORNEY

THOMAS H. FLOWERS
INVENTOR

BY Hall & Houghton
ATTORNEY

United States Patent Office 2,770,678

Patented Nov. 13, 1956

2,770,678

AUTOMATIC TELEPHONE EXCHANGE SYSTEMS

Thomas Harold Flowers, London, England

Application August 3, 1950, Serial No. 177,411

Claims priority, application Great Britain August 12, 1949

37 Claims. (Cl. 179—18)

This invention relates to automatic telephone exchange systems and particularly to line selection in such systems.

*Exchange switching*

A telephone exchange may be considered as a switch having sets of terminals on each of two sides, control of the switch effecting connection between terminals of any selected set of terminals on one side and an equal number of terminals of any selected set of terminals on the other side. Each subscriber on an exchange has his exchange line connected as an incoming circuit on one side of the switch and as an outgoing circuit on the other side. Incoming junctions, that is junctions carrying traffic from other exchanges, and other circuits for example manual board circuits, bringing traffic to the exchange, are also connected on the incoming side. Outgoing junctions, that is junctions carrying traffic to other exchanges, and other circuits taking traffic from the exchange, for example, manual board circuits, which will be designated service circuits, are connected on the outgoing side.

A calling signal, whether from a subscriber or operator connected to the exchange or from an incoming junction from another exchange, is applied to an incoming circuit which then becomes a calling circuit and the calling signal is followed by called number signals, for example dial impulses, indicative of an outgoing circuit to which connection of the calling circuit is to be made for successful completion of the call. In each case the outgoing circuit to which connection is to be made and which will be designated a called circuit, may be the one line of a particular subscriber having only one line, or one of a number of subscribers lines in a P. B. X group, or one of a number of junctions in a group of outgoing junctions to another exchange or one of a number of circuits in a group of service circuits. The subscriber with only one line can be considered as a particular case of a P. B. X group of only one line. Hence in every case, a called circuit to which connection is to be made for the successful completion of a call is a circuit in a group of circuits, and each circuit may be engaged, that is be part of an established connection, or free if it is not engaged, at the time the connection is to be made.

Except for very small exchanges, it is unusual practice to construct a single switch large enough to accommodate all the incoming and outgoing circuits and accordingly an exchange usually is built up with a number of smaller switches in series and parallel connection to produce the effect of a single switch. The switches are connected in ranks and subscribers lines may be connected as outgoing circuits to the terminals on one side of one rank of switches and as incoming circuits to the terminals of one side of further switches known as line finders. What will be termed bridge circuits are used to connect line-finder switches to a first-rank of switches and link circuits are used to connect following ranks of switches in a manner which will later be described in greater detail. One side of each switch will be referred to as the bank side and the other as the selector side according to the convention that progression through a switch or switches from an incoming circuit to a bridge circuit is from bank to selector side of the switch or switches, and progression from a bridge circuit through a switch or switches is from selector to bank side of the switch or switches. In this specification it is assumed that incoming junctions may be connected to the selector side of first rank switches via line-finders and/or bridge circuits and outgoing junctions may be connected to the bank side terminals of one or more ranks of switches.

*Modes of switching*

In its most general form the problem of selection comprises the selection of a group of called circuits designated by the called number signals originated from a calling incoming circuit, the selection from within the group of called circuits of a circuit which is both free and has at least one free path to the calling circuit, the selection of a free bridge circuit and free link circuit or link circuits of a free path and the connection of the free called circuit over the free bridge and link circuits to the calling circuit. In a narrower but in practice more usual form, where a calling incoming circuit is connected directly or through a line-finder to a bridge circuit, which then becomes a calling bridge circuit, the connection being made over the bridge circuit or not made at all, the problem of selection comprises the selection of a group of called circuits designated by the called number signals originated from a calling bridge circuit, the selection from within the group of called circuits of a circuit which is both free and has at least one free path to the calling bridge circuit, the selection of the free link or links of a free path and the connection of the free called circuit over a free link or free links, to the calling bridge circuit. If the called number signals designate to a non-existent group of called circuits, or if there are no free circuits within the group of called circuits, or if there are no free paths between the free circuits of the group of called circuits and the calling circuit, the problem of selection further comprises signalling the relevant fact to the calling circuit either directly or by connecting the calling circuit to a service circuit which sends back the required signals.

*Modes of selecting (marker and group systems)*

Known selecting systems can be divided into two classes. In one, called group selecting systems, selection proceeds stage by stage, each stage comprising the selection of a group of links and finally a group of called circuits each designated by a portion of the called number signals, each selection of a group of links or circuits being followed by the selection of a free link and finally a free circuit within the group of links or circuits. In the second class, selection is accomplished through the agency of markers and usually proceeds in the order (1) selection of the group of called circuits, (2) selection of a free circuit in the group of called circuits, (3) selection of the links of a free path between the selected called circuit and the calling circuit and (4) connection of the calling to the selected called circuit over the selected links. The present invention is in the marker class but has as one of its novel features a different order of selection of the links and called circuits.

*The marker system of this invention*

According to the present invention in an automatic telephone exchange line selecting system comprising a marker and at least one switch having at least one set of selector terminals for connection to a speech trunk, a signal trunk and a forward marking trunk and at least one set of bank terminals for connection to a speech trunk and a signal trunk, a marker lead associated with each set of bank terminals, means for signalling the condition free or engaged of the speech trunk connected to each set of bank terminals, means responsive to a mark on a marker lead for backwardly marking the associated speech trunk if it is signalled to be free, each switch is provided with a common marker lead which is marked when at least one speech trunk on the bank side of the switch is marked, further means being provided for marking the marker leads of a group of bank terminals designated by called number signals communicated to the marker. The switch operates automatically in response to a mark on a forward marking trunk and at least one backwardly marked speech trunk to connect the speech and signal trunks associated with the forward marking trunk each to each, to one of the backwardly marked speech trunks and its associated signal trunk.

A system according to the invention may include at least two ranks of switches, incoming circuits each connected to the speech trunk terminals of a set of selector terminals of a first rank switch, either directly or when calling via a line-finder and a bridge circuit, outgoing circuits each connected to the speech trunk terminals of a set of bank terminals of a switch of any rank, and link circuits connecting successive ranks of switches, each link circuit comprising leads connecting the speech and signal trunk terminals of a set of bank terminals of a switch in one rank to the corresponding speech and signal trunk terminals of a set of selector terminals of a switch in the next highest rank in a predetermined manner. According to a feature of the invention, the circuits of a group of outgoing circuits may be connected to any set of bank terminals of any switch in any rank of switches.

In a system embodying the invention, means are provided for communicating called number signals received over a calling incoming circuit to the marker and further means are provided for marking the forward marking trunk of the calling circuit. The common marker lead for each switch is connected to the marker lead of each speech trunk in a previous rank of switches connected over a link to the switch and each forward marking trunk is connected to a corresponding signal trunk. These features in combination enable an incoming circuit which is marked over its forward marking trunk to be automatically connected over free links between ranks of switches to a free outgoing circuit in a group of outgoing circuits designated by the called number signals.

*Copending applications for switch, per se*

Other features of the invention will appear in the subsequent description and although the switches employed may take any convenient form suited to the functions they have to perform, those described in the specification of the present application's British Patent No. 674,092 and his corresponding U. S. application Ser. No. 56,619, filed Oct. 26, 1948 (now U. S. Patent No. 2,666,809, issued Jan. 19, 1954), or further developed for example as disclosed in patent applications U. S. Ser. Nos. 191,584 Flowers and Flood, filed Oct. 23, 1950 and 181,394 Harper, filed August 25, 1950 (now Patent Nos. 2,716,731 issued Aug. 30, 1955 and 2,695,333 issued Nov. 23, 1954 respectively) may be used with particular advantage.

*The drawings*

In order that the invention may be more clearly understood an automatic telephone exchange system having a line selecting system embodying the several features of the invention will now be described in greater detail by way of example, with reference to the accompanying drawings in which.

Figure 2:
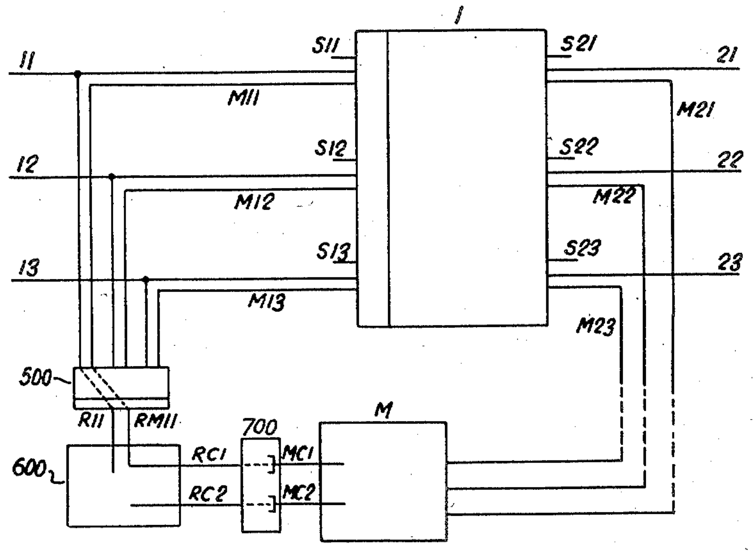
Fig. 2 is a development of part of Fig. 1.
Figure 3:
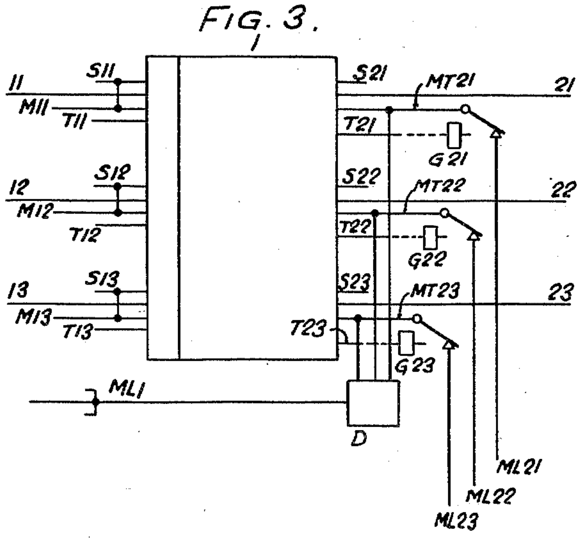
Figure 4:
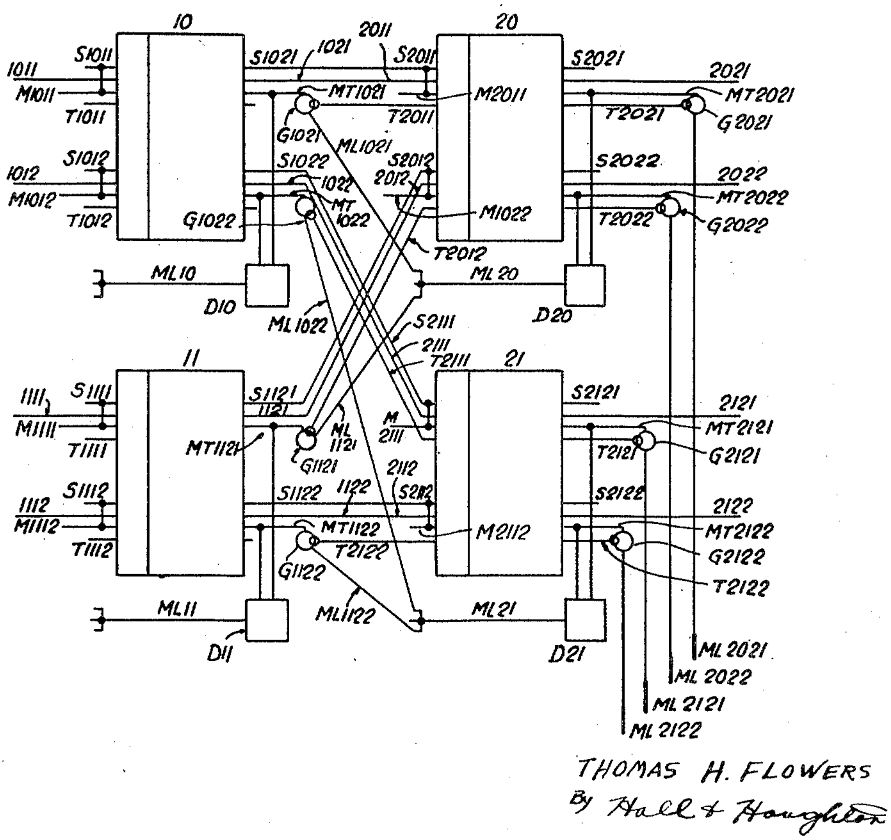
Figure 5:
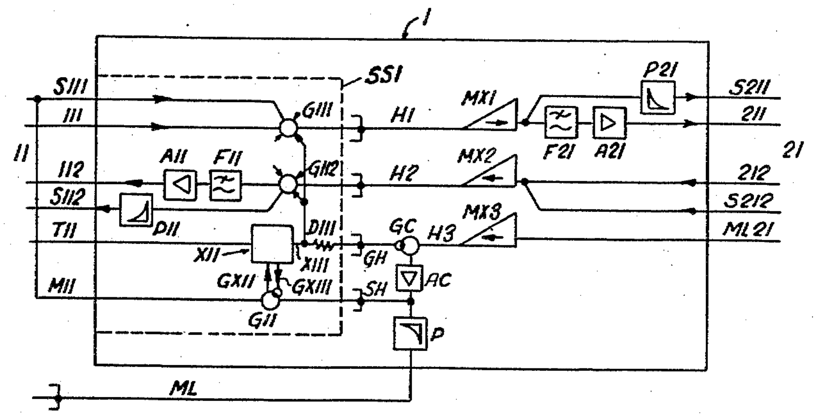
Figure 6:
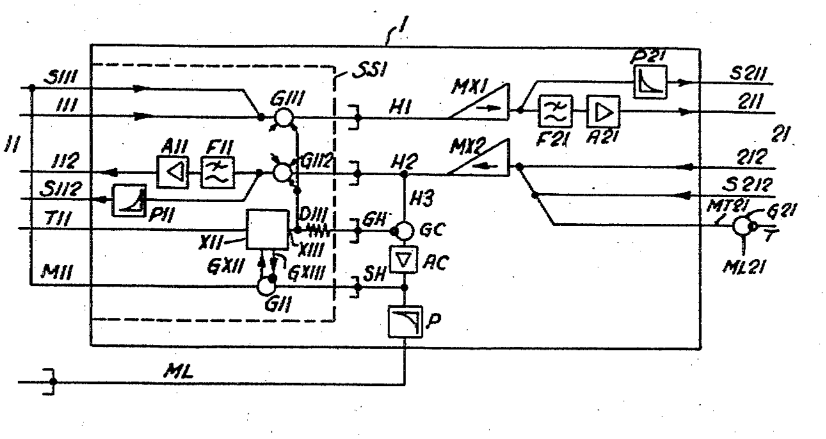
Figure 7:
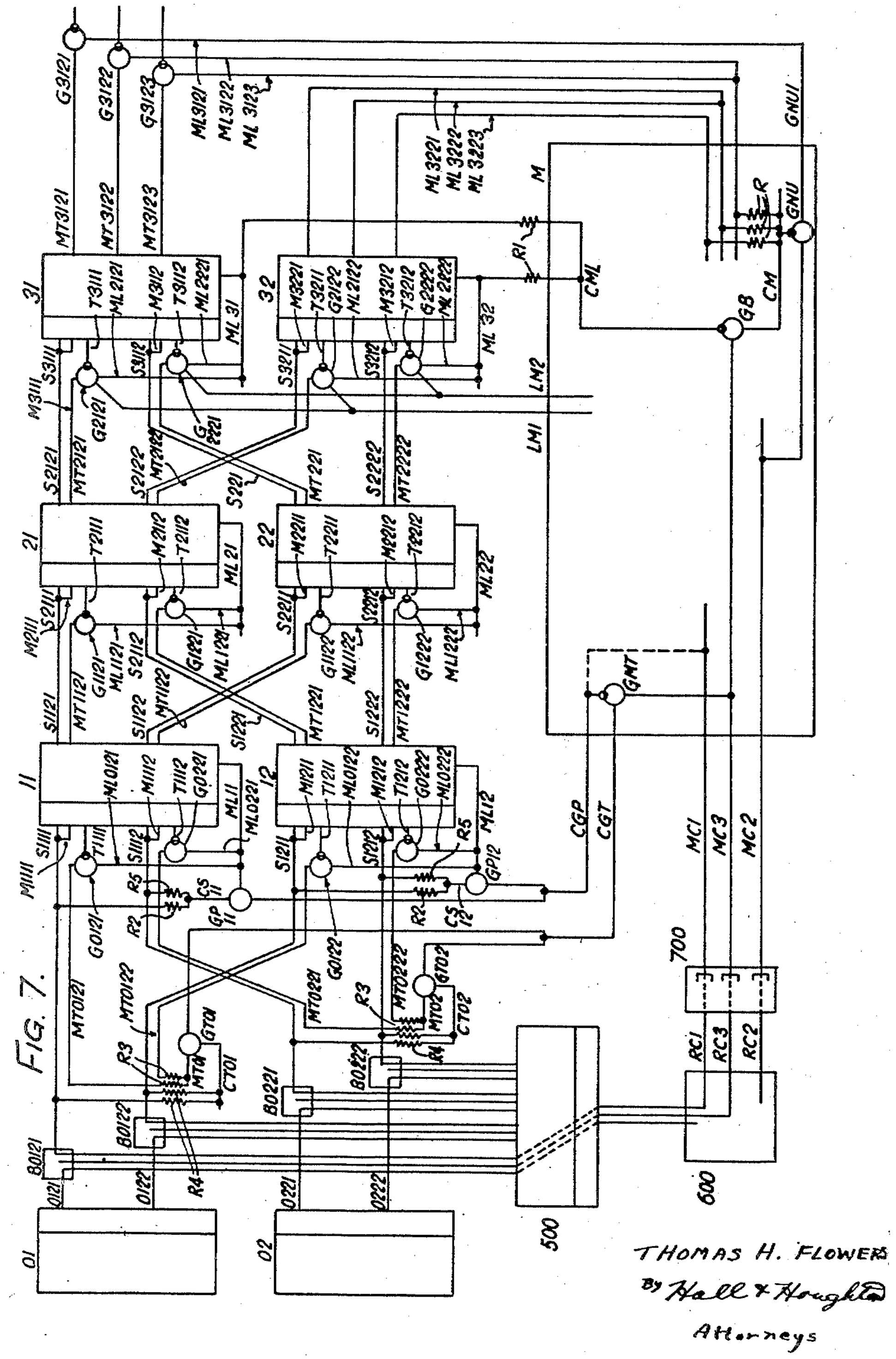
Figure 8:
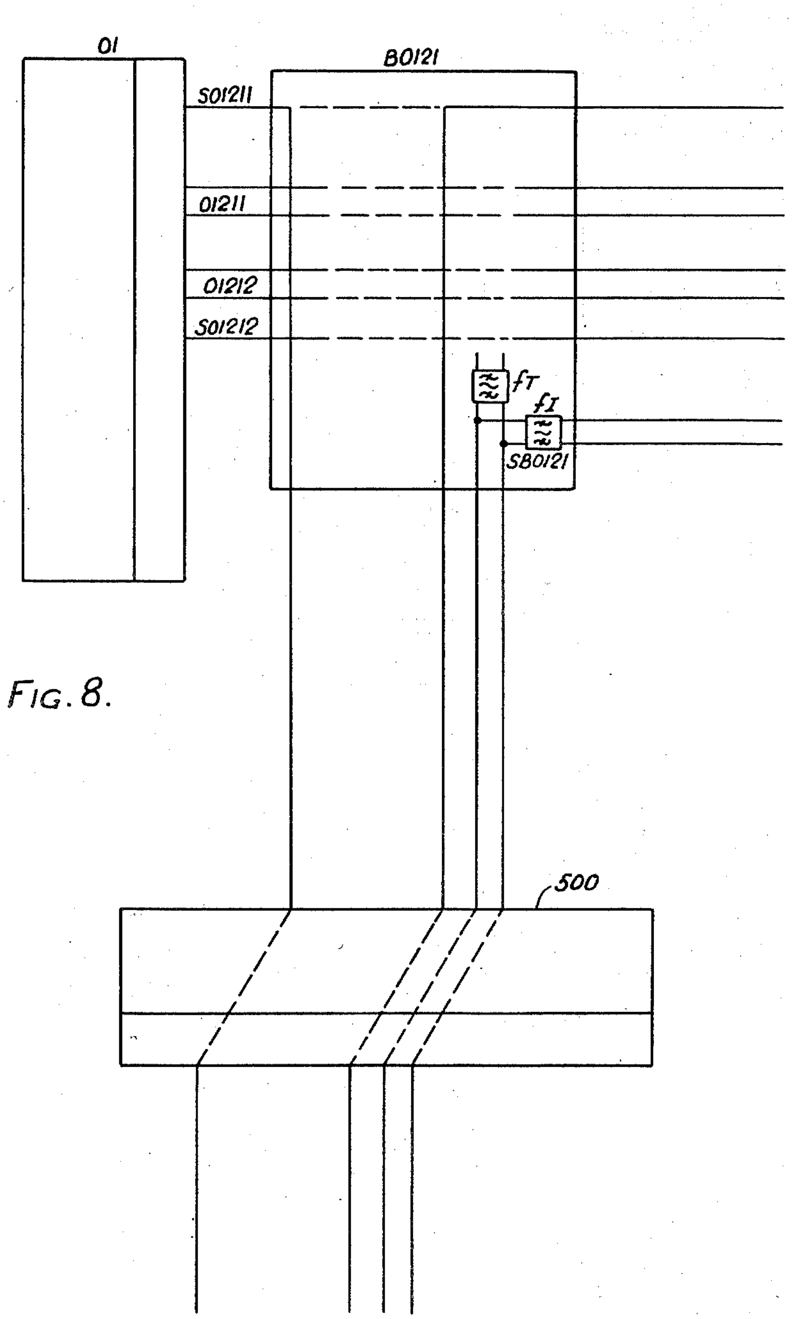
Figure 9:
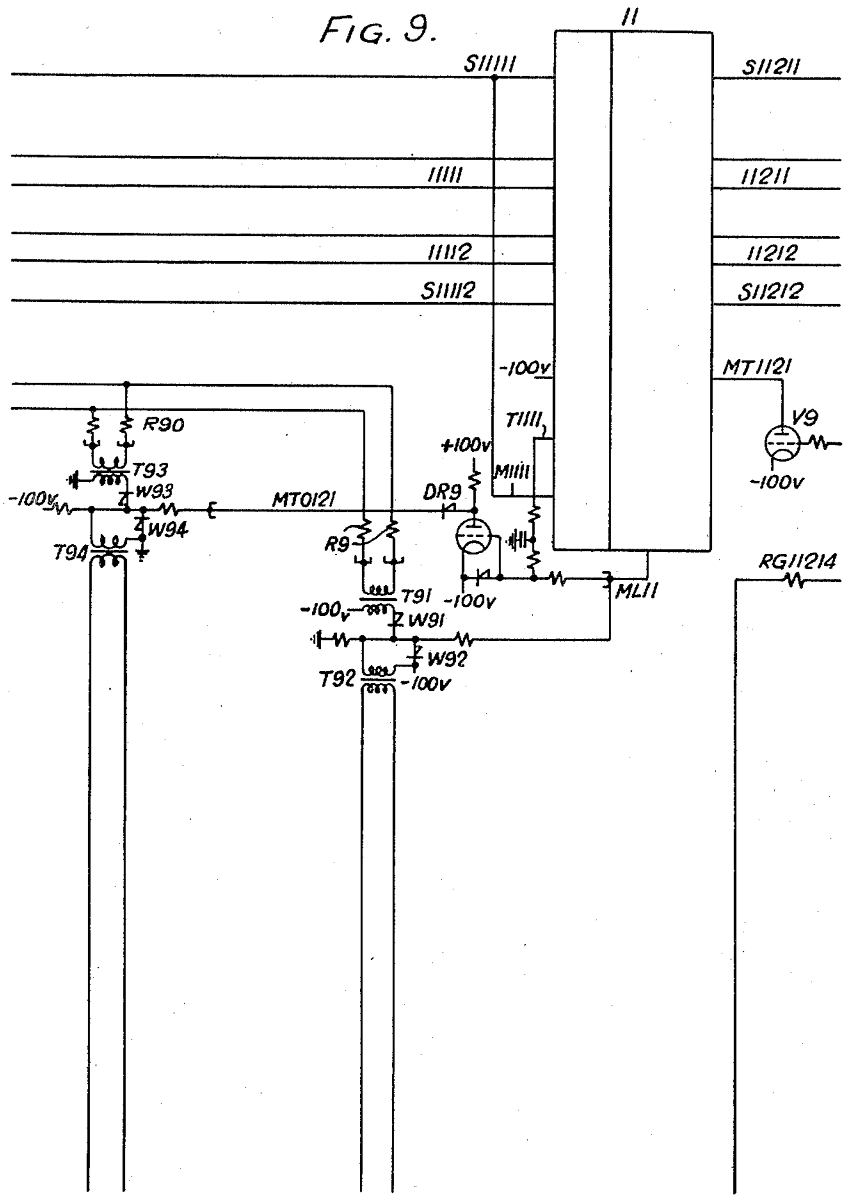
Figure 10:
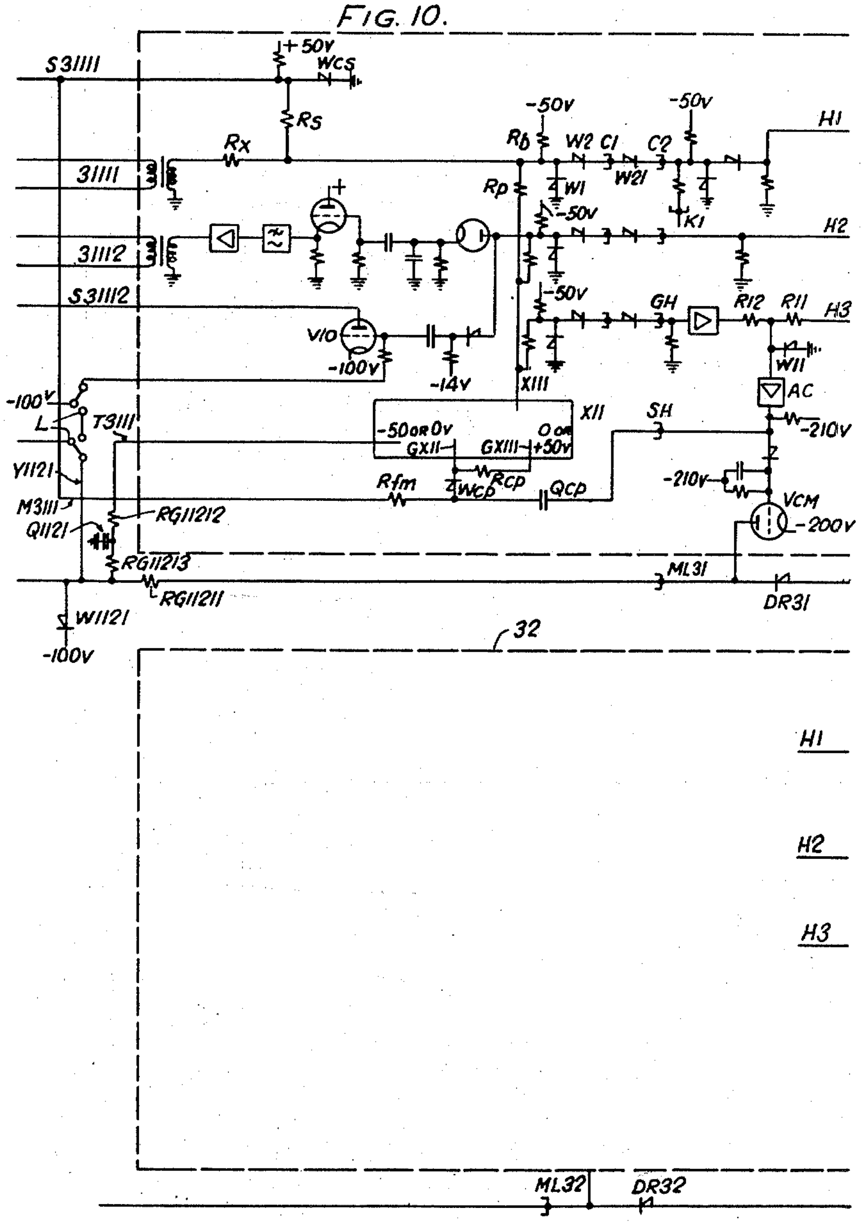
Figure 11:
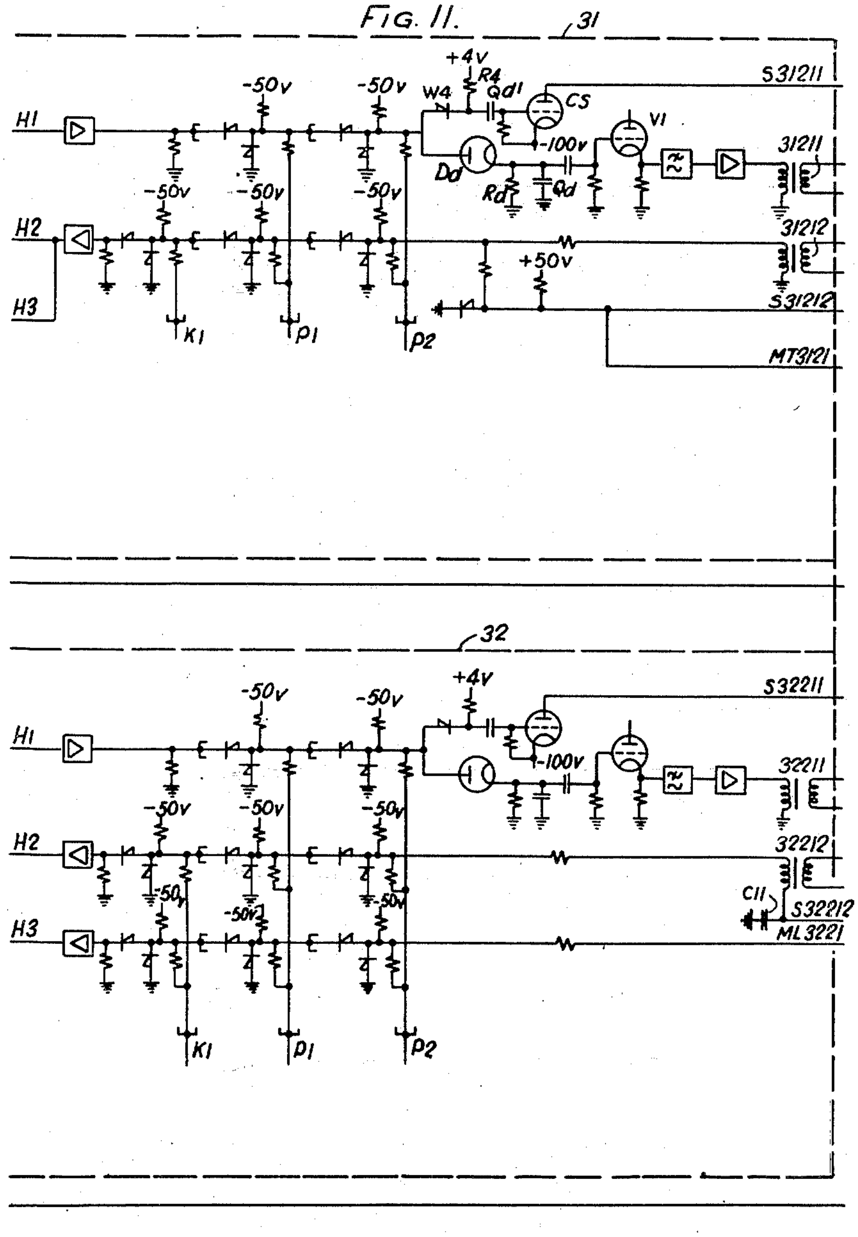
Figure 12:
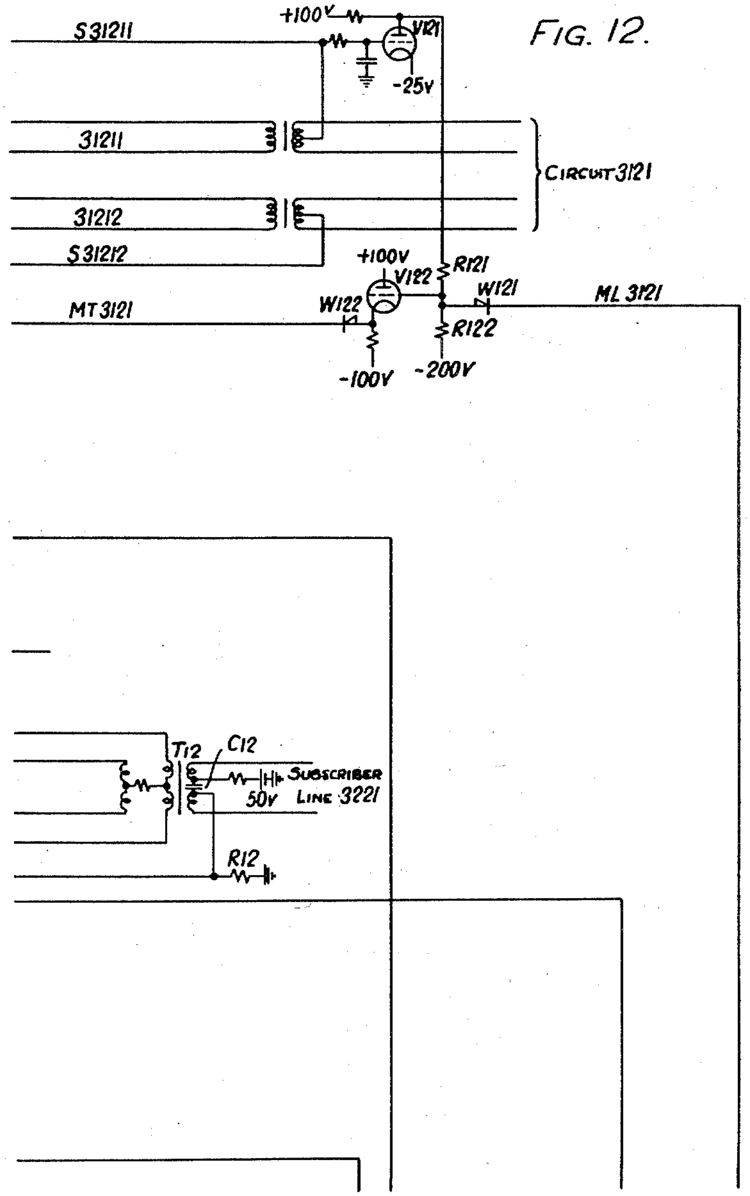
Figure 13:
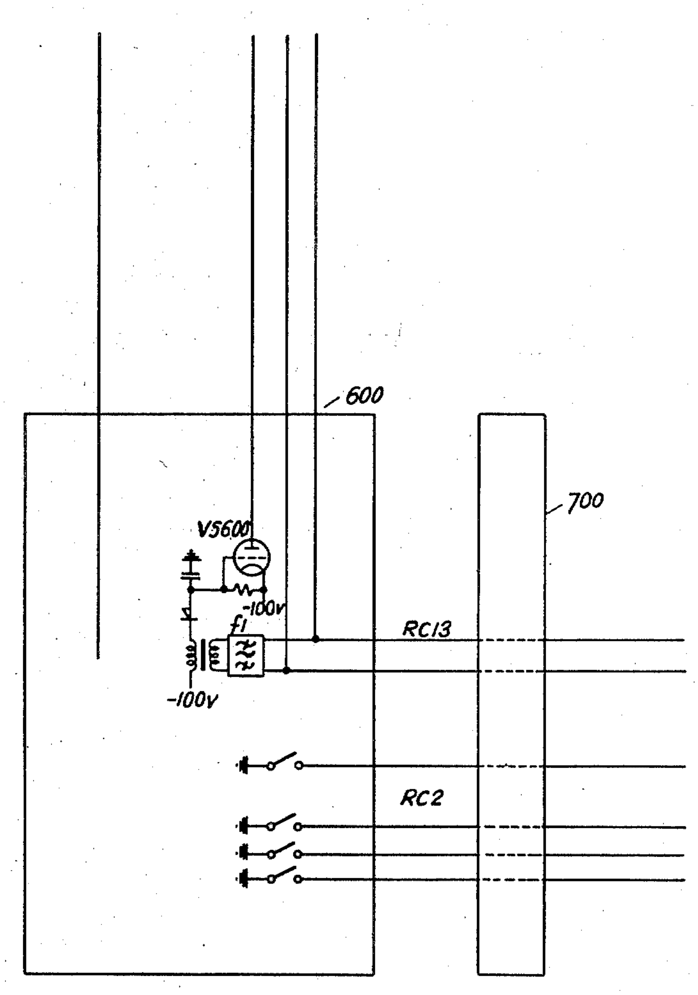
Figure 14:
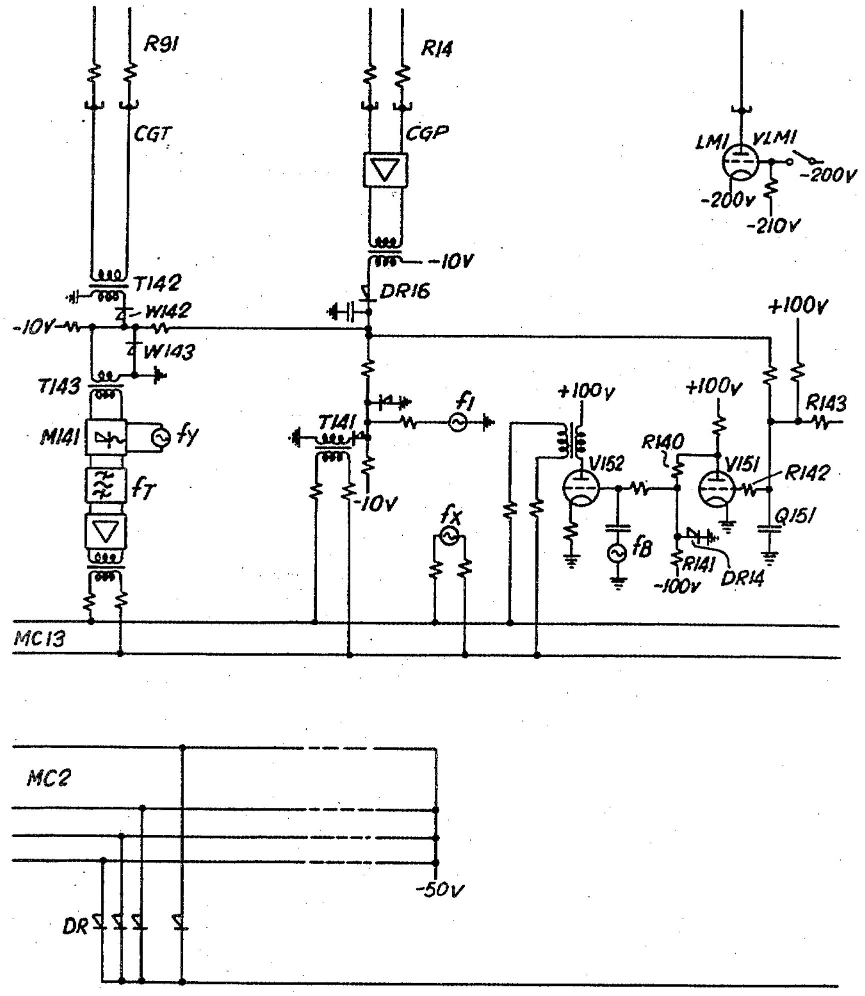
Figure 15:
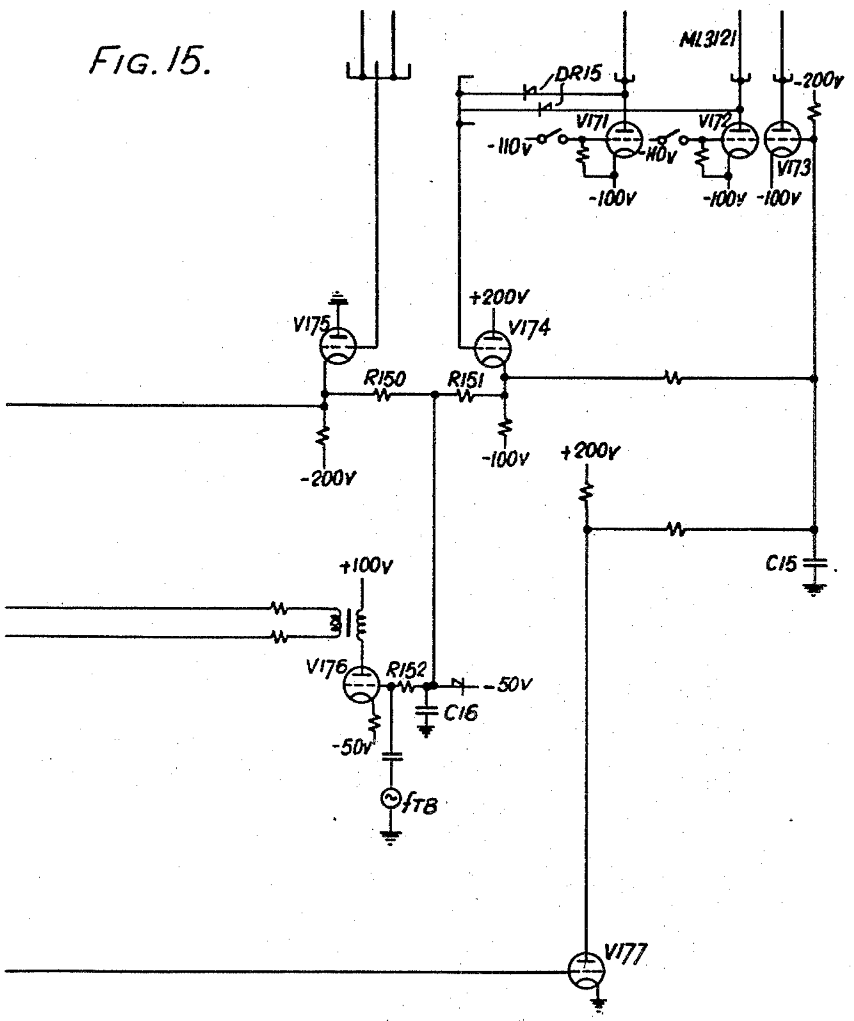
Figure 16:
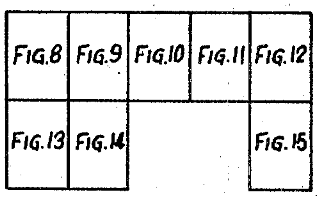
Figure 17:
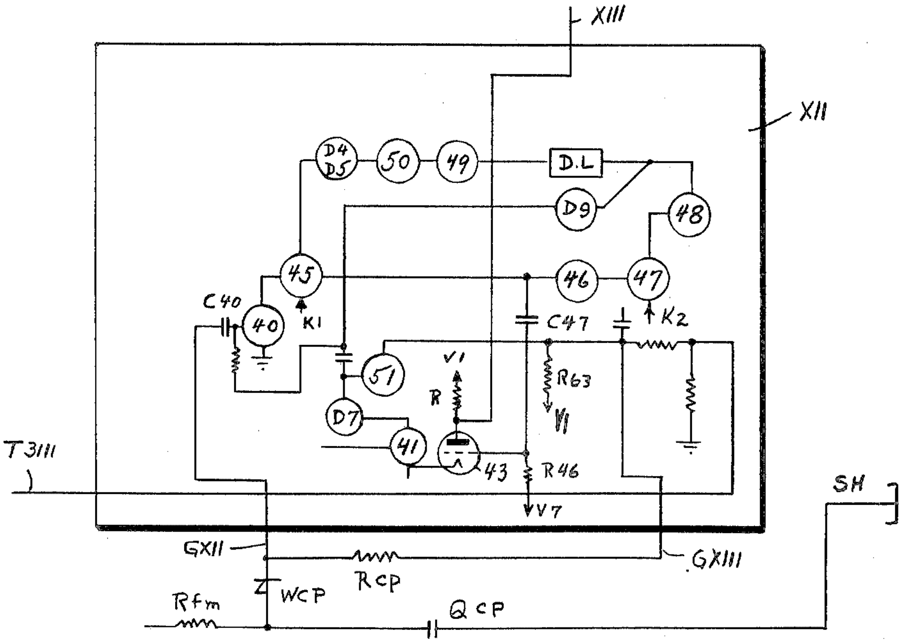
Figure 18:
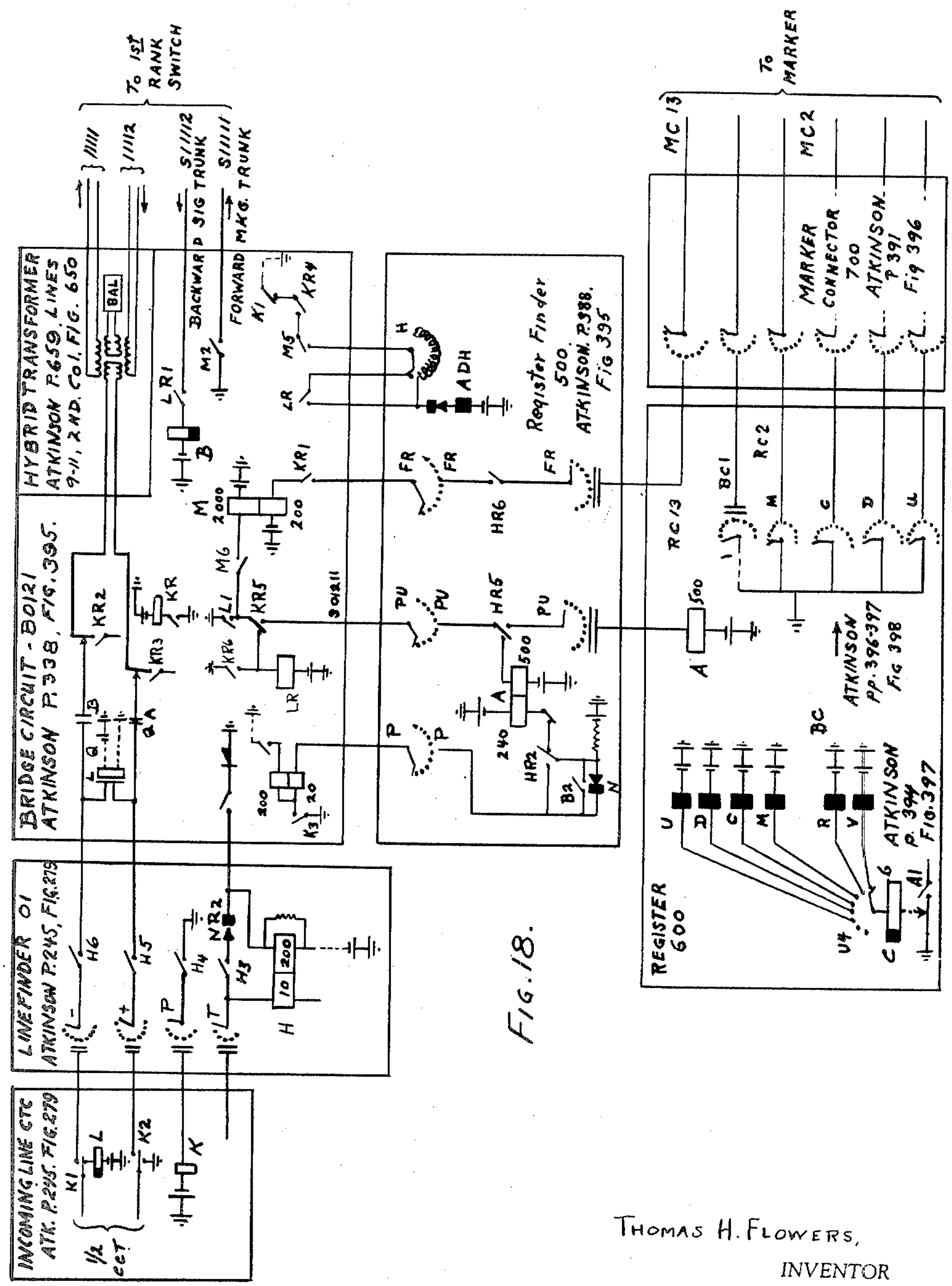
Figure 19:
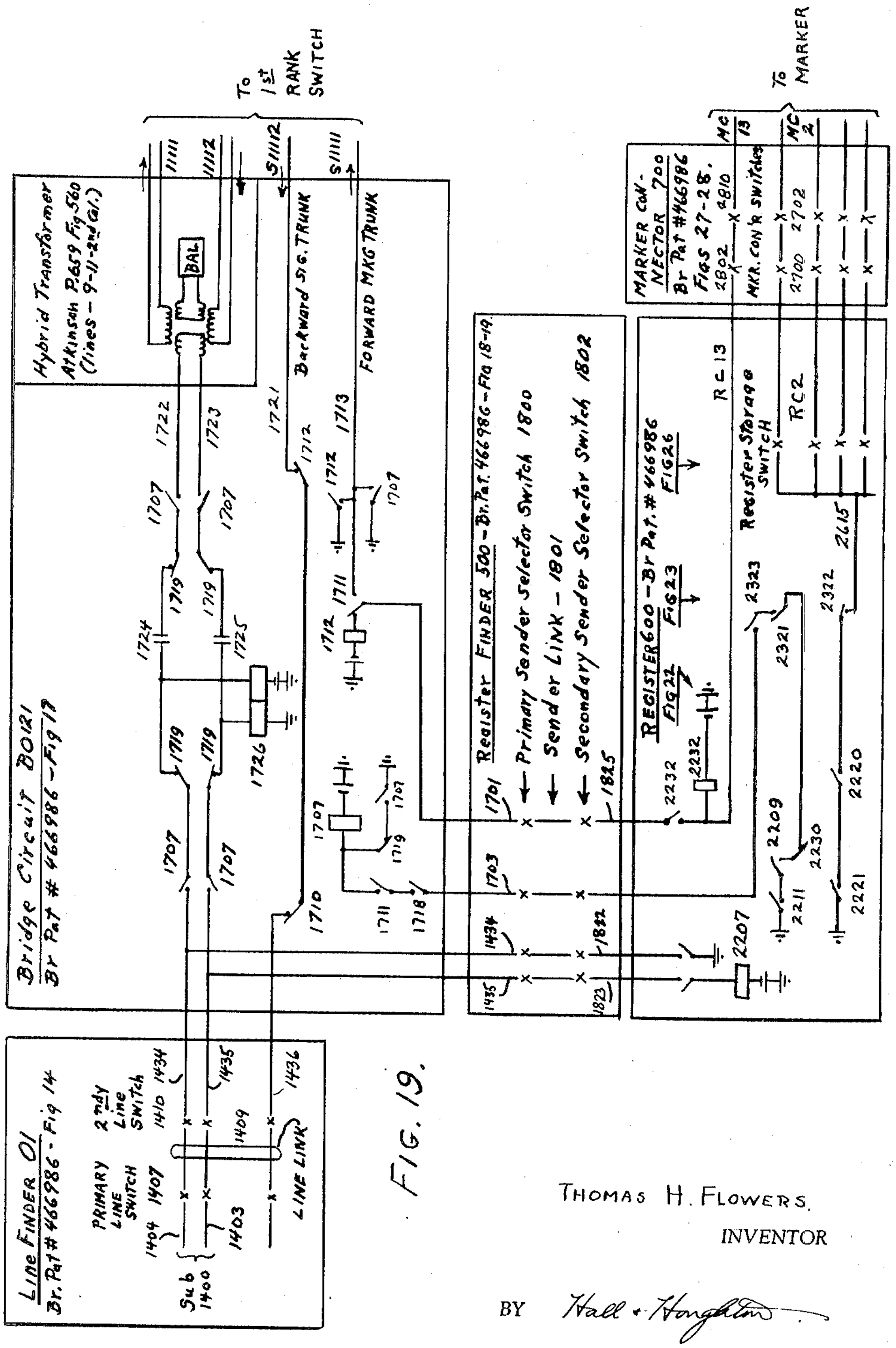

Fig. 3 is a development of part of Fig. 2 and illustrates certain features of the invention, Fig. 4 is a development of Fig. 3, Figs. 5 and 6 show diagrammatically particular forms of switch which may be employed in carrying out the invention, Fig. 7 shows diagrammatically the essential components in a complete line selection system embodying the invention, Figs. 8 to 15 show portions of a line selecting system in greater detail and are intended to be assembled in the manner shown in Fig. 16, while Figs. 17, 18 and 19 are diagrams illustrating how known forms of equipment therein designated may be employed as element XII in Fig. 10, and as elements indicated by block diagrams in Figs. 8 and 13, respectively. In the arrangement of Figs. 8 to 15, Fig. 8 shows a line finder switch 01 with circuits comprising speech and signal entry and exit trunks on its selector side connected through the bridge B0121 and register finder switch 500 of a bridge circuit; Fig. 9 shows a first rank switch with circuits comprising speech and signal entry and exit trunks on its selector side connected to the bridge circuit outputs, with link circuits comprising speech and signal entry and exit trunks on its bank side, and with circuits through which the marker forwardly marks the calling circuit (forward marking of signal trunk S11111) and through which backward marking of free link circuits is accomplished (backward marking); Figs. 10 and 11 show two second or final rank switches 31 and 32 with selector side circuits connected to the link circuits of Fig. 9, with bank side circuits connected to called circuits, and with forward and backward marking trunks; Fig. 12 shows called circuits with forward mark controlled backward marking means; Fig. 13 shows a register and marker connector associated with the bridge circuit of Fig. 8 and the markers of Figs. 14 and 15; Fig. 14 shows marker controlling circuits MC2 and register associated forward marking circuits MC13 with free link indicating and link group transfer circuits associated therewith, and with a marker relay controlled "appropriate" link group marking means VLM1; and Fig. 15 shows marker relay controlled backward marking means V171, V172, free called circuit indicating means V175, busy signalling means V176, and delayed action "number unobtainable" indicating means V173.

*General circuitry (Fig. 1)*

Figure 1:
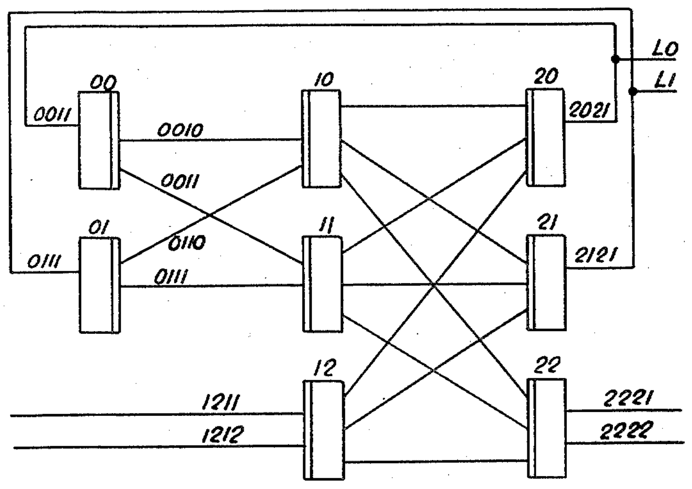
Fig. 1 is an explanatory block diagram.

Referring to Fig. 1 of the drawings, the switches are represented by rectangles, the single line sides of which represent the bank terminal sides, the double line sides representing the selector terminal sides. Subscribers lines L0, L1 are connected as outgoing circuits 2021, 2121 to the bank terminals of switches, 20, 21 and as incoming circuits 0011, 0111 to the bank terminals of switches 00, 01 which will be called line-finders and which concentrate the traffic originated by the incoming circuits to circuits 0010, 0011, 0110, 0111 connecting the selectors of the switches 00, 01 to the selectors of the switches 10, 11. Incoming junctions 1211, 1212 from other exchanges are shown in the figure connected as incoming circuits to the selectors of switch 12 and outgoing junctions 2221, 2222 as outgoing circuits to the bank terminals of switch 22. Incoming junctions are also in some instances connected through line finders as is shown for the subscriber's lines. The banks of switches 10, 11, 12 called the first rank of switches are connected to the selectors of switches 20, 21, 22 called the second rank of switches, by circuits arranged so that there is at least one circuit from the bank of each switch in the first rank to a selector of each switch in the second rank. The diagram shows only one circuit between each switch in the first rank to each switch in the second rank, but it is to be understood that in general there are groups of circuits so connected. It will be seen that there is at least one path through the switches and over the circuits between switches from every incoming circuit and every outgoing circuit so that connection can be established between any calling to any called circuit and in this respect the series connection of the switches is equivalent to one large switch. It is not exactly equivalent in two imporatnt respects. Firstly, between a calling and a called circuit there is not an unequivocal path through one switch, but what can be a very large number of paths through switches and over circuits between switches, one of which paths has to be selected. Secondly a connection between a calling and a called circuit is not independent of any other connection because the circuits between switches which provide the multiple paths from one calling circuit to one of the called circuits are common to the multiple paths from other calling to other called circuits. Hence the connection between a calling circuit and a called circuit over a particular path can be made only if no part of the path is engaged on another connection. It can happen that when an attempt is made to establish a call between a free calling and anyone of the free circuits in a group of called circuits, all the circuits of all the paths between the calling circuit and all the free called circuits are engaged on other connections so that the required connection cannot be made.

Further ranks of switches in series connection with those already described can be used to increase the size of the exchange still further, and economies in switch provision are frequently achieved by arrangements of connections between switches which restrict the availability of connection of called circuits to calling circuits so that in fact not every called circuit can be connected to every calling circuit, but although the present invention is applicable in such cases they are not material to the understanding of the invention.

The circuits connecting the line finder switches to the first rank of switches are the bridge circuits previously referred to and those connecting the ranks of switches are the link circuits or links. An incoming or a bridge circuit becomes a calling circuit when it starts a new call and requires connection to an outgoing circuit, which becomes a called circuit, in a group of outgoing circuits, which becomes a called group of circuits, designated by the called number signals. So far in reference to Fig. 1 the only circuits which have been considered are those between and over which the flow of speech currents which is the object of the exchange is accomplished. The control of the speech circuit connections requires other circuits and leads to be connected to and through the switches. Also exchanges are usually built-up of a number of identical switches to which may be connected incoming, outgoing, bridge or link circuits depending on the position of the switch in the exchange. The term trunk will be used as a general term to describe any path terminating at least at one end on switch terminals and over which electrical signals of any kind can be communicated.

*Marker operation (Fig. 2)*

As previously stated the present invention involves the use of markers and a method of operation with markers is illustrated in Fig. 2. Referring to that figure, incoming circuits 11, 12, 13 are connected to the selectors and outgoing circuits 21, 22, 23 are connected to the bank treminals of a switch 1. The switch 1 may take the form shown in the dotted box 31, Figs. 10–11, as hereinafter described. Associated with each incoming circuit 11, 12, 13 is a signal trunk S11, S12, S13 respectively, the purpose of which will be described later, and a forward marking trunk M11, M12, M13 respectively. Each speech circuit and marking trunk is connected to one side of a register-finder switch 500, the other side of which has connected to it a number of registers of which one, 600, is shown. When an incoming speech circuit, for example 11, calls i. e. signals that it requires a connection through the switch, the register finder 500 connects the speech circuit and its associated marking trunk to a free register 600, the speech circuit 11 and marker trunk M11 then being connected as shown by dotted lines into the register over leads R11 and RM11. A marker connector 700 is connected to every register by a number of leads of which only two, RC1 and RC2, are shown connected to the one register in the figure and to the marker M by a number of leads of which only two MC1 and MC2 are shown. The called number signals are then received by the register. When the register has received enough of the called number signals to determine the connection through the switch, and, when the marker M which serves all calls is free, the marker-connector 700 connects, as shown by dotted lines, the extended marker trunk RM11 over leads RC1 and MC1 and the lead RC2 over the lead MC2 to the marker M.

Associated with each outgoing circuit 21, 22, 23 is respectively, a signal trunk S21, S22, S23, and a backward marking trunk M21, M22, M23. Marker M in response to signals over the leads RC2 and MC2 and indicative of the group of called circuits applies an electrical signal called a mark to one of the backward marking trunks, the mark being applied to the backward marking trunk of a free circuit in the group of called outgoing circuits the free circuit then being said to be marked. The means by which the marker is connected to the backward marking trunks, and by which a free circuit in the group of called outgoing circuits is selected and the mark applied is indicated in Fig. 2 by dashed lines between the marker and the backward marking trunks.

When the marker marks the free called circuit it also marks the lead connected through the marker connector to the lead RM11 and hence the forward marking trunk, in this case M11, of the calling circuit which is then said to be marked. The action of the switch is that when both a circuit connected to the selector side and a circuit connected to the bank side are marked, the selector connects the two marked circuits and their signal trunks together, each to each. Having established the connection, the marker removes the marks and is free to repeat the operation to set up other connections through the switch. The means of signalling to the marker that connection is established so that the marker can release is assumed. The purpose of the signal trunks is to provide a path over which signals may be passed inter alia to hold the connection established throughout the call and finally to disconnect the connection at the termination of the call. Although for the purpose of illustration, only one signal trunk is shown in the figure, the number of signals which has to be given frequently demands more than one signal trunk to be passed through the switches and it is to be understood that as many as are needed will be provided in a practical system. It is also to be understood that where speech circuits and signal trunks are separately referred to that this includes arrangements whereby a speech circuit and a signal trunk share the same leads.

The simple case of a single switch presents no great difficulty since the forward and backward marks are applied to the terminals of a single switch. Where many switches have to be used in series or in series and parallel connection, the problem becomes more difficult. The forward and backward marks applied by the marker are applied to different switches with links and generally other switches in between. Moreover in order to spread the load evenly on different switches and for other reasons, it is desirable that the selecting system should allow the circuits of each group of outgoing circuits to be connected to any part of the bank of any final rank switch. With more than one rank of switches it is necessary to have in addition to the marker which marks called outgoing circuits, link markers to mark links and in the most general case, bridge circuit markers to mark a bridge circuit over which connection can be made. The present invention provides a novel solution to this problem.

*Marker and test trunks ( Figs. 3 and 4)*

Fig. 3 shows a single switch 1, a number of which when assembled in ranks in series and connected as will be described, illustrate the main features of the invention. In the following description the term speech trunks will be used as a general term to designate the ends of communication circuits which terminate on switches, the communication circuits being incoming, outgoing, bridge and link circuits. To the selector side terminals of switch 1 are connected speech trunks 11, 12 . . . each with an associated signal trunk S11, S12 . . ., a forward marking trunk M11, M12 . . . and a test trunk T11, T12 . . . The switch provides signals on each test trunk to indicate whether its associated speech trunk is free or engaged. To the bank terminals of the switch are connected speech trunks 21, 22 . . . each with an associated signal trunk S21, S22 . . . and a backward marking signal trunk MT21, MT22 . . . and a test signal trunk T21, T22 . . . on the last of which the switch signals the free or engaged condition of the speech trunks. Associated with each speech trunk on the bank side of the switch is a switching device G21, G22 . . . which in Fig. 3 is shown as, and in this description will be called, a relay, and in some applications of the invention would be an electromechanical relay, but in a preferred application of the invention would consist of static apparatus which will then be called a gate circuit for example resistors, and/or electronic devices performing the functions of a relay. To a break contact of the relay G21 for example, is connected the backward marking trunk MT21 and a marker lead ML21, the other end of the marker lead being connected to a marker not shown in this figure. Corresponding connections are provided for the relays G22, G23. A mark appearing on a marker lead will be communicated through the relay contact to the backward marking trunk thus marking the associated speech circuit only if the relay is unoperated. The coil of the relay is connected to a test trunk over which a signal is provided and operates the relay if the speech circuit is already engaged on a connection. The signal may be given by the test trunk associated with the speech trunk or by apparatus connected to the speech trunk, for example junction equipment or the test trunk of a speech trunk in the next rank of switches. In the figure the coil of the relay is shown connected to the test trunk of the speech circuit with which the relay is associated, but to indicate that other connections are possible the connection is shown dotted. In practice the choice of connection is a matter of expediency. The important point is that a mark appearing on a marker lead shall mark the associated speech circuit only if the circuit is free and means of accomplishing this end are well-known. A feature of the invention is that in general several circuit marker leads are marked simultaneously, their associated bank circuits being marked only if they are free. The action of the switch as required by the present invention is that when one speech trunk on the selector side is marked and at least one speech trunk on the bank side is marked, the switch automatically connects the marked speech trunk and its signal trunk on its selector side each to each, to one of the marked speech trunks and its signal trunk on the bank side, and in addition signals over one or both the test trunks involved and for so long as the connection is maintained, that the speech trunk associated with the test trunk is engaged. This action is a feature of electromechanical uniselector-type line-finders and of the electronic switch disclosed in my co-pending application Serial No. 56,619, above mentioned. Switches which possess the action of automatically joining one speech trunk marked on the selector side to one, but no more than one, marked speech trunk on the bank side can be made suitable for use with the present invention by the addition to the bank side of an apparatus which when more than one bank circuit is marked selects one of the marked circuits for marking at the switch. The features of the present invention illustrated in Fig. 3 are firstly, the connection of the forward marking trunks M11, M12 . . . to their associated signal trunks S11, S12 . . . and secondly the provision of a common marker lead ML1 individual to the switch and which is adapted to be marked whenever a speech circuit on the bank side of the switch is marked. In the figure this is indicated by a device D connected to the common marker lead ML1 and to all the backward marking trunks and communicates the mark on any marking trunk to the common marker lead but prevents the mark on one marking trunk from being communicated to any other marking trunk.

Referring now to Fig. 4, four switches as shown in Fig. 3, are connected in two ranks in series and further illustrates the main features of the invention. Switches 10 and 11 are in the first rank, 20, 21 are in the second rank and the designations of the trunks, leads and relays correspond to those of Fig. 3 with the switch number prefixed to the numerical portion of the designation. Incoming circuits are connected either directly or through line-finders or other apparatus to the speech trunks connected to the selectors of the first rank of switches (cf. Fig. 1). The speech trunks and their associated marking trunks may be connected through register-finders to registers which can connect through a marker connector to the marker, as described with reference to Fig. 2, but these features are not shown in Fig. 4. Outgoing circuits are connected either directly or through other apparatus to the speech trunks connected to the bank terminals of the second rank of switches. The backward marking trunk, marker lead and test trunk associated with each speech trunk on the bank side is connected to a relay as shown in Fig. 3. In applying a further feature of the invention although not shown in Fig. 4, the marker leads are commoned in groups corresponding to the groups of outgoing circuits. The marker in response to called number signals, marks the commoned group of marker leads designated by the called number signals. The links between the two ranks of switches are formed by connecting each speech trunk on the banks of the first rank of switches to a speech trunk on the selector side of a switch in the second rank of switches according to some preferred plan the diagram showing four such links, the signal trunks associated with each two speech trunks which are joined together also being connected together, and, as already stated, with the forward marking trunk of the selector of the second rank of switches.

A link connects two speech trunks which are thus free or engaged simultaneously. Hence the test trunk at the second rank selector end of the link can signal to the relay at the first rank bank end of the link the free or engaged condition of the speech trunk associated with the relay. For example, the link which joins speech trunks 1021 and 2011 has its relay G1021 joined to the test trunk of speech trunk 2011. The common marker lead of each switch in the second rank of switches is connected, in the application of a feature of the invention, to the marker lead of each relay associated with a speech trunk connected over a link to a speech trunk connected to the selector side of the second rank switch. For example in Fig. 4 the common marker lead ML20 associated with switch 20 is connected to the marker leads ML1021, ML1121 of relays G1021, G1121, the associated speech trunks 1021, 1121 of which are connected over links to speech circuits 2011, 2012 connected to the selector side of switch 20.

The connection of a calling trunk to a free called trunk in a group of called trunks is illustrated by the following example, reference being made to Fig. 4. In that figure, a relay is represented by a symbol more general than the conventional electro-magnetic relay shown in Fig. 3. It is indicated by a circle to which a marking trunk and a marker lead are connected, the circle being intersected by a smaller circle to which a test trunk is connected, it being understood that a mark on the marker lead is communicated to the marking trunk unless the test trunk signals that the associated speech circuit is engaged. Let it now be assumed that the call originates on incoming trunk 1011 and is connected through a register finder to a register in the manner already described with reference to Fig. 2. When sufficient of the called number signals have been received in the register to define the group of outgoing trunks to a free one of which connection is required, and when the marker is free, the register connects through the marker connector to the marker and applies over a lead or leads signals indicative of the group of called trunks to which connection is desired. The marker marks the forward marking lead through the marker connector, the register, and the register finder, to the forward marking trunk M1011 of trunk 1011. At the same time the marker applies a backward mark to the marker leads connected to the relays of all the outgoing trunks of the group of called trunks, whereby all the free outgoing trunks of the group of called trunks are marked. In the example illustrated in Fig. 4, the outgoing circuits are connected to speech trunks numbered 2021 and 2022 on switch 20, and 2121, 2122 on switch 21, and it will be assumed that all are in the same group of outgoing circuits and further that trunks 2021, 2022 and 2121 are free. The marking trunks of these free trunks will therefore be marked. The marks on the marking trunks MT2021, MT2022 are communicated to common marker lead ML20, and that on trunk MT2121 to common marker lead ML21 via the devices D20, D21 respectively. The mark on lead ML20 is communicated to the relay of trunk 1021 of switch 10, and 1121 of switch 11, and assuming the links to be free, to the corresponding marking trunks. The mark on lead ML21 is communicated to the relays of trunks 1022, 1122, and again assuming the links to be free, to the corresponding marking trunks. Switch 11 now has trunks marked on its bank side but no trunk marked on its selector side. It therefore remains inactive. Switch 10, however, has a marked trunk 1011 on the selector side, and marked trunks 1021, 1022 on the bank side, and will connect trunk 1011 to one of the trunks 1021, 1022. Assume that it selects trunk 1021. When connection through the switch is complete, the mark on forward marking trunk M1011 will be communicated over the signal trunk S1011, through the switch to signal trunk S1021 and hence over the link signal lead to forward marker trunk M2011 on switch 20. Switch 20 will now connect trunk 2011 to either trunk 2021 or 2022 and thus complete the connection. If however switch 10 had selected trunk 1022 for connection to trunk 1011, the mark on trunk 1011 would have been extended to marking trunk M2111 so that trunk 1011 would ultimately have been connected through switch 21 to trunk 2121. It can thus be seen that in a simple manner any calling trunk can be connected to any free called trunk that has a free link over which the connection can be made. It can also be seen that any number of ranks of switches each consisting of any number of switches can be used with the incoming and outgoing circuits connected to the selectors of the first rank and the banks of the last rank switches respectively, with links between the ranks of switches and marking of the trunks and links as described in the example given.

*Preferred switch, multiplexing (Figs. 5 and 6)*

In a preferred arrangement for carrying the invention into effect, the switches used are designed as disclosed in the specification of the present applicant's application Serial No. 56,619 filed October 26, 1948 together with further developments disclosed in patent applications Serial Nos. 191,584 filed October 23, 1950 and 181,394 filed August 25, 1950. The relevant details of these switches are illustrated in Fig. 5, in which a switch represented by rectangle 1 has a bank side to the right and a selector side to the left. The selector side comprises selectors of which one is represented by the apparatus within the dashed line rectangle SS1. Speech trunks connected to a selector each comprise two channels called forward and backward speech trunks and capable of transmitting speech in one direction only, one pair of channels being shown, marked 111, 112, and with arrows to show the direction of speech transmission, the two channels making one both-way speech circuit. Associated with each speech trunk is a forward and a backward signalling trunk S111 and S112 respectively. The forward signalling trunk S111 and speech channel 111 are connected to an apparatus G111 which may be termed a modulator or a gate circuit and which, when the speech channel is engaged, is adapted to be operated at regular intervals to connect the forward speech and signalling trunks to a channel H1 common to all selectors. The gate circuit G111 therefore applies to channel H1 time spaced signals corresponding to the trunk 11. These signals will be impulses which may for example be of 0.2 microsec. duration occurring every 100 microsecs. The channel H1 is connected to one side of a multiplex device MX1 to the other side, called the bank side, of which is connected a number of further channels. The multiplex device connects the channel H1 to each further channel in cyclic order. In the example already quoted there may be 100 further channels each of which is connected to the channel H1 for 0.2 microsecond every 100 microsecs. The further channels will be called bank channels. Each bank channel is connected over two paths, one via a low-pass filter F21 and amplifier A21 to a forward speech trunk 211 which is part of the speech trunk 21 connected on the bank side, the other via apparatus P21 which will be described later, to a forward signal trunk S211. A signal, for example a D. C. current, applied to signal trunk S111 causes an impulse to appear on channel H1 when gate circuit G111 is operated, and A. C. speech or other currents on speech trunk 111 causes these impulses to be amplitude modulated in accordance with the instantaneous amplitude of the A. C. at the times the gate circuit is operated. The gate circuit is adapted to be operated at times corresponding to the times that one of the bank channels of the multiplex MX1 is connected by the multiplex to the common channel H1. The impulses produced on common bus H1 by the signal on S111 are therefore received over a bank channel, lengthened and amplified by the apparatus P21 to a D. C. signal corresponding to the signal applied to S111, and applied to the forward signal trunk S211 of the bank channel. The modulation of the pulses produced on H1 by the A. C. signals on 111 is demodulated by the low pass filter F21 and amplified by the amplifier to a signal corresponding to that applied to the speech trunk 111. Hence a forward speech and signal trunk connected to a selector of the switch can be effectively connected to any one pair of forward speech and signal trunks on the bank side of the switch provided that the selector gate circuit is operated at the times that the multiplex connects the required bank channel to the common channel H1.

For the reverse direction of transmission of speech and signals, a multiplex MX2 connects backward speech and signal trunks 212, S212 to a common channel H2 at the same instants that the multiplex MX1 connects the corresponding forward speech and signal trunks to channel H1. A signal on a signal trunk causes impulses which are modulated by A. C. signals on the speech trunk, the impulses being gated in a selector by a gate circuit G112 operated at the same times as the other gate circuit G111, converted to a backward signal on a signal trunk S112 by a device P11 similar to P21, and demodulated to an A. C.

signal by a filter F11 amplified by an amplifier A11 and applied to a backward speech trunk. In this manner the backward speech and signalling trunks associated with similar forward trunks effectively connected through the switch are also effectively connected together.

Associated with each speech trunk on the bank side is a marker lead, ML21 for trunk 21, which in Fig. 5 is connected to a bank channel of a multiplex MX3 which connects the marker lead to a common channel H3 at the same instants that the multiplexes MX1, MX2 connect the forward and backward speech and signal trunks to the channels H1, H2. A mark on a marker lead produces marker impulses on channel H3 coincident with the times that the speech and signal trunks associated with the marker lead are connected to channels H1 and H2. Unlike the arrangement of Fig. 3 wherein every marker lead is connected to its own relay, in the time division multiplex switch there is a pulse suppression gate circuit GC performing the function of a relay common to all marker leads and connected to the common marker pulse channel H3. Marker pulses which pass the gate pulse suppression circuit GC become marking pulses and are amplified by an amplifier AC and are then applied to a common marking pulse channel SH and to a starting pulse gate circuit G11 in each selector, the starting pulse gate circuit being normally unoperated. The forward marking trunk M11 of the selector is also connected to the gate circuit G11 which operates when the forward marking trunk is marked and thus connects the common marking pulse channel SH over a lead GX11 to an apparatus X11 designated a selector pulse generator which when it operates in response to a pulse over lead GX11 performs a number of operations. It emits over lead X111 an impulse coincident with the impulse received over lead GX11 and further impulses thereafter at intervals equal to the multiplex cycle time. The impulses over the X111 lead therefore coincide in time with the marking impulses that operated the apparatus X11 and with the times that the trunks corresponding to the marking pulses are connected to the common channels H1 and H2. The impulses over lead X111 are applied to the gate circuits G111, G112 which are caused to connect the forward and backward speech and signal trunks of the selector also to the common channels H1 and H2 whereby the connections through the switch are made as previously described. The impulses over lead X111 are also applied through a decoupling arrangement or gate circuit represented by resistor D111 to a common channel GH connected to the gate circuit GC. Pulses received over the common channel GH operate on the gate circuit GC to prevent pulses over common channel H3 from passing to amplifier AC and thence to common channel SH. The channel GH is the common test trunk, the channel SH is the common marking trunk, and the gate circuit GC is the common relay for all the speech trunks connected on the bank side of the switch. A marker pulse corresponding to a trunk on the bank side connected by a selector to a trunk on the selector side will be prevented from passing through the common gate circuit GC by a pulse received over channel GH. Hence the marking pulses which appear over the channel SH correspond only to free speech trunks connected on the bank side of the switch and are said to mark these trunks. It is desirable for practical reasons that the inhibiting pulses over channel GH should have a much longer duration than the marker pulses which they suppress. This is provided by the apparatus X11, but since the gate circuits G111 and G112 are supplied with the same impulses and must be operated for the shorter time and substantially in synchronism with the multiplex impulses, as explained in the above mentioned copending application, they are also connected to a source of synchronising impulses (not shown herein) and adapted to be operated only during the time that both a synchronising impulse and an impulse over lead X111 exist.

The apparatus X11 when operated by an impulse over lead GX11 immediately operates over lead GX111 to prevent any further impulses passing through the gate G11. If more than one speech trunk on the bank side is marked when the selector forward marking trunk is marked, the apparatus X11 responds to one of the corresponding marking pulses and no other, and thus selects one of the marked trunks on the bank side.

The apparatus X11 is also connected to the selector test trunk T11 and when operated functions to signal on the test trunk that the speech circuit connected to the selector is engaged.

In Fig. 5 the forward signalling trunk S111 is shown connected to the forward marking trunk M11 in accordance with a feature of the invention. Also in accordance with another feature of the invention, a marker lead ML common to the switch is provided and marked whenever a speech trunk connected to the bank terminals is marked. A speech trunk is marked by marking impulses appearing on the common channel SH, to which is also connected an apparatus P which lengthens and amplifies the impulses to a D. C. or continuous mark which is applied to the common marker lead ML connected to the marker lead of every speech trunk, in the previous rank of switches, which is connected over a link to a selector of switch 1.

The switch illustrated in Fig. 5 is equivalent as regards all its connections with other switches and markers to the switch illustrated in the previous figures. It may be used for switches of any rank, and is particularly suitable for final rank switches to which subscriber's lines are connected, but other arrangements may be desirable in certain cases.

It is assumed in Fig. 5 that a bank trunk is free when no selector is pulsing coincidently with the bank trunk channel pulse. This may not be true during the clear down of a connection, for example if the bank trunk is connected to a junction which takes a relatively long time from the initiation of release to final release. In some cases it may therefore be preferable to interpose in the marker lead a gate circuit, to which is also connected a test trunk over which the free or engaged condition of the bank trunk is signalled, the gate circuit having the action that a marking pulse is generated by the marking multiplex when the marking lead is marked and the bank trunk is signalled to be free. In this case the pulse suppression gate circuit may be omitted and the output from the marking multiplex taken directly to the common marking channel. It is then assumed that a bank trunk which is signalled to be free over a bank test trunk is not connected over the switch to a selector, which assumption may not be true in certain circumstances connected with the clear down of connections through the switches. It may therefore be desirable to guard against the possibilities of connections in either direction by the provision of both a gate circuit on the bank side and a common pulse suppression gate as is illustrated in Fig. 6.

Referring now to Fig. 6, all the parts which are identical with Fig. 5 are identically designated. The differences are concerned with the use of relays or gate circuits G21 one for each speech trunk on the bank side, to which is connected a marking trunk MT21 and the marker lead ML21 for the speech trunk and a test trunk T on which is signalled from apparatus connected to the speech trunk the free or engaged condition of the speech trunk. If free, a mark on the marker lead is communicated to the marking trunk but if engaged the mark is not so communicated. Because marking but no signalling is required up to the time that a connection is established through the switch and signalling but no marking thereafter the marking trunk and the backward signalling trunk may be connected together and share the same multiplex, the common channel H3 then being connected to the common channel H2 instead of to a separate multiplex, the multiplex MX3 in Fig. 5.

*Exchange arrangement* (*Fig. 7*)

An exchange embodying the various features of the invention is shown in more detail in Fig. 7 which also illustrates additional features not so far described.

Referring to Fig. 7, three ranks of switches are shown, the switches 11 and 12 forming the first, 21 and 22 the second, 31 and 32 the third rank. In this figure the designations of the connections to the switches are the same as in Fig. 3 with the addition of the switch number as a prefix to the numerical portion of the designation. All speech trunks and unused test trunks have been omitted from the figure, as has also been the device D (Figs. 3 and 4), the common marker leads being shown as coming out of the switch as in Figs. 5 and 6. The marker leads of the final rank switches are shown grouped and connected to a marker M. Switch 31 has its marker leads connected to relays to which are also connected backward marking trunks to the switch, and test trunks to apparatus connected in the speech trunks. The outgoing circuits connected to the speech trunks would in practice be junctions to other exchanges, and service circuits. Switch 31 is, in this application of the invention, of the type shown in Fig. 6. Switch 32 is, in this application of the invention, of the type shown in Fig. 5, the outgoing circuits connected to its banks being subscribers lines, and their marker leads being grouped and connected to the marker M. The first and second rank switches are of the type shown in Fig. 6.

The connection of forward marking trunks to corresponding signal trunks and the connection of the common marker lead of each switch to the marker lead of each speech trunk in the previous rank of switches connected over a link to the switch, as already described can be traced.

Switches 01 and 02 are line finders which are used to connect both subscribers lines and incoming junctions, as each becomes a calling circuit, to the speech trunks on the selector sides of the first rank switches via bridge circuits each including an apparatus designated B0121, B0122 . . . , and which will be called a bridge. When an incoming circuit on the bank side of a line finder calls, it is connected through the line-finder to a free bridge circuit. A trunk from the line-finder selector side and the forward marking trunk to the selector side of the first-rank switch, and a further signalling trunk which will be referred to later, are connected through the bridge to a register finder 500 and to a register 600. The forward marking trunk and the signalling trunk, together with a further lead from the register, are connected over leads RC1, RC3, RC2, through the marker connector 700, over leads MC1, MC3, MC2 to the marker, when a connection is to be made as described for Fig. 2. The called number signals are communicated to the marker M over the leads RC2, MC2 and the marker marks the commoned marker leads of the group of outgoing circuits designated by the called number signals. In the embodiment of the invention already described, the marker also marks the forward marking trunk of the calling bridge circuit whereby a free circuit in the group of called circuits is automatically connected to the calling circuit over free links, as already described for Fig. 4. If there are no free circuits in the group of called circuits, or free circuits but no free links over which the connection can be made, no connection is made and the further features of the invention are concerned, inter alia, with this condition.

The number and arrangement of the switches required in any particular exchange depends on many factors including the traffic which has to be carried, the numbers of incoming and outgoing circuits, the capacity of the switches employed and the trunking between the ranks of switches. The most economical arrangements usually require the outgoing junctions to be connected to the banks of earlier ranks of switches than those to which subscribers' lines are connected and may require not only this but also, separately and in combination, that different groups of junctions shall be connected to different ranks of switches, that different groups of subscribers' lines shall be connected to different ranks of switches, and that some switches shall have connected to their banks two out of or all three types of circuit subscribers' junction and link. The present invention is particularly advantageous in that it may be applied to any trunking arrangement and the choice of the most economical arrangements in particular exchanges is thereby facilitated. In Fig. 7, for example, where the outgoing junctions are shown connected to third rank switches, they may be connected if required instead or as well to the banks of second rank or first rank switches to which link circuits may also be connected, and subscribers' lines and outgoing junctions may both be connected to the banks of the same switches.

*Supervisory apparatus*

(1) *Fee Registers, etc.*—It is often desirable for reasons of economy to connect supervisory apparatus and the like in link circuits rather than as apparatus individual to incoming or outgoing circuits. For example, the fee which has to be registered for a connection through an exchange may depend on the time duration of the connection and the distance between the two parties to the conversation. It is common practice to provide different groups of apparatus, each group adapted to register a different fee, and in the process of setting up a connection, an apparatus which will register the appropriate fee is selected and included in the connection. It is economical of such apparatus to connect it in the links, for example, between the penultimate and final ranks of switches. The selection of such links for a connection between calling and called trunks is then subject to two conditions in addition to the condition that it should be free, one that the link should be in a path to a free called circuit, and the other that it should contain the appropriate supervisory apparatus. In applying a further feature of the invention links of the type described have two marker leads over which they may be marked, and the link is marked at its bank end only if it is free and marked over both marker leads. One marker lead is connected to the common marker lead of the higher rank switch to which the link is connected. The second marker lead is commoned with the second marker lead of all links containing the same type of supervisory apparatus and joined to the marker. In Fig. 7, this is indicated by second marker leads from the relays associated with the links between the second and third rank switches which are commoned and connected to the marker over leads LM1, LM2. When the marker marks the calling trunk and the marker leads of the called group of outgoing circuits, it also marks a group of link circuits over their second marker lead, the group of link circuits to be marked being designated for example, by the called number signals in conjunction with class of service signals communicated to the marker from the register along with the called number signals.

(2) *No such number signal.*—In applying another feature of the invention, if the called number signals designate a non-existent group of outgoing circuits, means are provided to connect the calling circuit to a service circuit which provides the number unobtainable signal. This feature is indicated in Fig. 7 by the connection of the lead MC2 over which called number signals are transmitted from a register to the marker, to a relay GNU which is also connected to a common lead CM which is in turn connected through decoupling resistors R or the like, to every marker lead with one exception connected to a commoned group of marker leads associated with a group of outgoing circuits. Normally in response to called number signals received over lead MC2, the marker marks a group of outgoing circuits which mark is communicated to relay GNU over the common lead CM and relay GNU is adapted under this condition to be inoperative. If, however, no group of outgoing circuits is marked, the called number signals thus corresponding to a non-existent group of outgoing circuits, relay GNU is adapted to mark over lead GNU1 a group of service circuits which provide number unobtainable signal and to one of which the calling circuit will be connected over the links in the normal way. Marker lead GNU1 is the one exception previously mentioned, that is, it is not connected to common lead CM.

(3) *Busy signal.*—In the application of a further feature of the invention, means responsive to a mark on a group of marker leads from the marker and to the absence of a mark on the common marker lead of any switch to which outgoing circuits are connected are provided to detect if there are no free circuits in a group of called circuits and to signal the busy condition to the calling circuit. In Fig. 7, the common marker lead ML (ML31, ML32 ——) of each final rank switch is shown connected through decoupling resistors R1 or the like, to a common lead CML. A relay GB is connected to common leads CML and CM and to the lead MC3. The mark on the marker leads to a group of outgoing circuits is communicated to the common lead CM, and if any outgoing circuit in the group is free, a mark will appear on the common marking lead of the switch to which the free circuit is connected, and hence on the common lead CML. Relay GB is inoperative to this condition. If, however, there is no free circuit in the called group of circuits, there will be a mark on the lead CM but none on the lead CML, and relay GB functions under this condition to transmit a busy signal to the calling circuit for example, as shown in Fig. 7 as a signal over the lead MC3 and hence through the marker connector, the register, the register finder and the signal trunk to the bridge in the calling circuit. This feature is of particular value in indicating that all the junctions to another exchange are busy so that a junction busy signal different from a subscriber busy signal can be given to initiate a connection by an alternative route if there is one for the particular call in question. The fact that it is a junction group and not a subscriber group of circuits that is busy can be detected in a number of ways, for example, terminating subscribers' lines and junction circuits on different final rank switches and joining the common marker leads of only those switches to which junctions are connected to the common lead CML. The relay GB can give the junction busy signal to the calling circuit either directly over lead MC3 as described or by marking a group of service circuits providing the junction busy signal as described for the number unobtainable signal.

(4) *Free path signal.*—In the application of a further feature of the invention, a free path signal is given to the marker when a free path exists from a calling bridge circuit over free links to a free called circuit. Referring again to Fig. 7 each first rank switch common marker lead ML (ML11, ML12 ——) is connected to a relay GP (GP11, GP12 ——). A mark on a forward marking trunk of a bridge circuit connected to a first rank switch is communicated through a decoupling register R2 or the like, to a common lead CS (CS11, CS12 ——) which is common to the first rank switch and which is also connected to relay GP. When backward marking from the marker becomes effective, a mark on the common marker lead ML of a first rank switch signals that connection to a free called circuit can be made from that switch. The forward mark on a common lead CS indicates the first rank switch to which the calling circuit is connected. Hence if a free path exists from the calling to a free called circuit, both the CS and ML common leads connected to a GP relay will be marked, and the relay is adapted under this condition to signal to the marker over a common lead CGP that the connection can be made.

(5) *Delayed busy and fault signal.*—In applying a still further feature of the invention, a marker, when connected to a calling circuit and after a time delay sufficient to allow connection of the calling circuit to a called circuit to be made if a free path exists, signals the busy condition to the calling circuit unless the free path signal previously referred to is received by the marker prior to the expiring of the delay time. If at the expiring of the delay time, the free path signal having been communicated to the marker, connection between a calling circuit and a called circuit has not been signalled, the marker signals a fault. These two features are not illustrated in Fig. 7 as means by which they could be carried into effect will be clear to those skilled in the art.

*Bridge check and transfer means*

Further features of the present invention are concerned with the transfer operation disclosed in the present applicant's co-pending application Serial No. 117,822 filed September 26th, 1949. According to one of these features, when a calling incoming circuit is connected through a line-finder to a bridge circuit which in turn is connected to a marker, means are provided to communicate a signal to the marker if a free path exists from the calling incoming circuit and over any bridge circuit and links to a free circuit in the group of called circuits.

Referring again to Fig. 7, each bridge circuit has a backward marking trunk MT connected to a relay which is connected to a test trunk from the selector side of the first rank switch to which the bridge circuit is connected and over a marker lead to the common marker lead of the first-rank switch to which the bridge circuit is connected. For example, the bridge circuit which connects trunks O121 and 1111 has a backward marking trunk MTO121 connected to a relay GO121 connected to test trunk T1111 and over marker lead MLO121 to common marker lead ML11. The backward marking trunks of each bridge circuit connected at one end to a particular line-finder are connected through decoupling resistors R3 or the like, to a common lead MT (MTO1 for line-finder O1) individual to the line finder. The forward marking trunks of each bridge circuit connected at one end to a particular line-finder are also connected through decoupling resistors R4 or the like, to a common lead, in this case CT (CTO1 for line-finder O1) individual to the line-finder. A mark on a line-finder common lead MT signals that connection to a free called circuit can be made through that line finder. A mark on a line-finder common lead CT signals that the calling incoming circuit is connected to the bank side of the line-finder. A mark on each of the common leads CT and MT of a line-finder denotes that a free-path exists from the calling incoming circuit to a free called circuit. The two common leads for each line-finder are each connected to a relay GT (GTO1 for line-finder O1) adapted to signal over a common lead CGT connected to the marker and to all GT relays when the stated free path exists.

In the application of a still further feature of the invention, when no free path exists from the calling incoming circuit, over a first bridge circuit to which it is already connected, to a free called circuit, but a free path exists from the calling incoming circuit over a second bridge circuit to a free called circuit, the marker initiates a transfer operation to transfer the connection through the line-finder from the calling incoming circuit to the first bridge circuit to a connection from the calling incoming circuit to the second bridge circuit, connection between the incoming calling circuit and free called circuit then proceeding in the normal way.

Referring again to Fig. 7, a relay GMT is shown in the marker and connected to the common leads CGP, CGT and by the full line to the signal trunk from the bridge in the calling bridge circuit via the lead MC3, marker connector, lead RC3, register and register finder. The relay GMT is adapted to send a transfer signal over the lead MC3 to the calling bridge circuit, if there is a signal over lead CGT that a connection can be made from a calling to a free called circuit over a second bridge circuit and at the same time there is no signal over lead CGP that the connection can be made over the first bridge circuit. The transfer signal is effective in transferring the connection of the incoming calling circuit through the line-finder from the first to the second bridge circuit in the manner set forth in application Serial No. 117,882. As there may be several second bridge circuits through which the connection made be made, a marker or other means of selecting one of the bridge circuits has to be provided.

*Detailed example*

Referring now to Figs. 8 to 15, these figures when assembled as shown in Fig. 16 show a particular application of the invention in greater detail than is given in the previous figures and with some additional features. The rectangle 31 which occupies the top half of Figs. 10 and 11 encloses a switch corresponding to the switch enclosed by the rectangle 1 in Fig. 6. The apparatus in Fig. 10 to the left of the common lead C2 and the common leads virtually beneath C2 correspond to a selector enclosed by rectangle SS1 in Fig. 6. Corresponding elements of the two switches are similarly designated where this is possible. Switch 31 occupies in the switching system the same position as switch 31 of Fig. 7. In this illustrative embodiment seven elements and sub-combinations, known per se, are shown in block diagram for simplicity, namely line finder switch O1, bridge switch BO121, register finder switch 500, register 600, marker connecter 700, switch 11, and the selector pulse generator XII of switch 31, and suitable forms for these elements are set forth at the end of this section of this specification.

(6) *Switch 31.*—To the bank side of the switch 31 are connected circuits to other exchanges, one of which, circuit 3121, is shown in Fig. 12. This circuit consists of forward and backward speech trunks 31211, 31212, and has associated with it the forward signalling trunk S31211, the backward signalling trunk S31212 and the backward marking trunk MT3121. To the selector side of switch 31 are connected link circuits to the previous rank of switches, which in this example are first rank switches, although any number of ranks may be used. One link circuit connecting switch 11 to switch 31 is shown in the figure, the link being formed by the direct connection together of the forward signalling trunks S11211 and S31111, the forward speech trunks 11211, 31111, the backward speech trunks 31112, 11212, and backward signalling trunks S31112 and S11212, and the connection through a gate circuit of the common marker lead for switch 31, ML31 and the backward marking trunk MT1121. In this example, the forward and backward marking trunks are normally at a potential of about —50 volts relative to earth potential and a marking trunk marks when its potential is substantially earth potential. When in this description particular voltages are mentioned it should be understood that these are for the purposes of example and ease of description and that other suitable voltages might be used. When a connection is made through the switch from a link on the selector side to a circuit on the bank side, the forward and backward signalling and speech trunks on the two sides are effectively connected together, each to each. The signal trunks can have at any one time one of two potentials, approximately earth or 50 volts below earth potential (—50 v.). Normally the signal trunks are at —50 volt potential. When connection has been made through the switch, the forward signalling trunk on the bank side will take the potential, earth or —50 v., of the forward signalling trunk on the selector side, and the backward signalling trunk on the selector side will take the potential of the backward signalling trunk on the bank side. The described signals and connections through the switch may be provided in a number of ways. The one which is shown in Figs. 10 and 11 is fully described in co-opending patent application Serial No. 191,584, filed October 23, 1950, and is briefly explained as follows.

Within the rectangle 31, the forward speech trunk is connected over a transformer and a modulator or gate circuit to a common channel H1. Each individual modulator comprises, as can be traced on the drawings, a shunt rectifier, a series rectifier, a source of bias current and a source of pulse current. The shunt rectifier has one side joined to earth; the other side of the rectifier is joined through a bias resistor to a —50 v. supply, through a resistor to a pulse source, and to one side of the series rectifier, the other side of the series rectifier being commoned to the other sides of series rectifiers of other individual modulators. A number of individual modulators thus commoned form a multiplex modulator; multiplex modulators can be joined in tandem to increase the number of multiplexed channels, the individual modulators then being channel, group, super group and so on modulators in dependence on their position in the multiplex.

The channel modulator for channel 31111 comprises the shunt rectifier W1, the series rectifier W2, bias resistor $R_b$ connected to the —50 v. bias source, resistor $R_p$ connected to a pulse source over lead X111, the modulating source trunk 31111 connected over a transformer to the resistor RX, and resistor $R_s$ connected at one end to a clamp rectifier W*cs* to earth, over a resistor to a positive 50 volt (+50) supply, and to the forward signalling trunk S31111. Assuming the signalling trunk to be at earth potential, the channel modulator delivers to the common lead C1, the pulse over lead X111 modulated by the speech currents over trunk 31111. If trunk S31111 is at —50 v. potential, there is no output pulse from the channel modulator. A group of channel modulators is commoned at C1 to a series rectifier W21, and a group of rectifiers W21 to the common C2. Between C2 and the channel H1 is a modulator driven by a pulse source K1 which produces continuous impulses, the modulator shortening all the impulses before they reach the channel H1. The impulses over channel H1 after amplification are applied to a multiplex modulator which distributes the impulses in time order to the channels on the bank side of the switch. The drawing shows a two-stage modulator and the two pulse sources P1 and P2. An impulse over channel H1 is communicated to the channels 31211 and S31211 when it coincides in time with an impulse of source P1 and an impulse of source P2. The impulse presented to the channels is positive with respect to earth potential and is presented to thermionic diode $D_d$ and rectifier W4. It charges up condenser $Q_d$ which discharges slowly between impulses through resistor $R_d$. The voltage across condenser $Q_d$ is communicated by cathode follower V1 to a low pass filter, the output of which is amplified and passed to the forward speech trunk 31211. The impulse presented to rectifier W4 if it exceeds a pre-determined amplitude, charges condenser $Q_{d}1$ through the grid-current of valve $C_s$. This valve is thus momentarily caused to take full anode current, but when the impulse ceases, the valve $C_s$ cuts off its anode current. As the ratio of the duration of the impulse to the time between impulses is very small, the valve $C_s$ is effectively cut off all the time. The anode of valve $C_s$ is arranged in the system to be connected through an impedance to earth potential. Hence the potential of the anode and that of the trunk S31211 is either earth or negative with respect to earth in dependence on whether channel impulses are or are not being received through the multiplex and causing a drop in the anode potential of CS from earth potential to —50 volts.

The signalling trunk S31111 on the selector side of the switch was assumed to be at earth potential when the course through the multiplexes was traced above and channel impulses received to cut off valve $C_s$ and thus to produce earth potential on trunk S31211. If trunk S31111 is at about —50 volts potential, the increased bias on the modulator comprising rectifiers W1 and W2 prevents an impulse being transmitted through rectifier W2 and hence to the channel connected on the bank side. No impulses therefore appear at rectifier W4, valve $C_s$ conducts and lowers the potential of trunk S31211 to about −50 volts. In the reverse direction of transmission through the switch, similar conditions are found. Speech and signals on trunks e. g. 31212 and S31212, on the bank side are multiplexed on to a common channel H2, thence distributed to trunks on the selector side joined through the switch to the trunks on the bank side, to produce similar speech and signals on trunks e. g. 31112 and S31112.

The condition for connection of trunks on the selector side to trunks on the bank side is that impulses over lead X111 of the selector side trunks should coincide in time with the multiplex channel pulses of the trunks on the bank side. Switches in which this condition automatically results when one selector side trunk and at least one bank side trunk is marked have been fully described in co-pending patent applications Serial Nos. 56,619, 181,394 and 224,874, previously referred to. In this example, the action is shown schematically in Figs. 10 and 11. Referring to switch 31, forward and backward marking trunks M3111 and MT3121 are shown. The mark condition on both of these trunks is earth potential, the no mark condition a potential of about −50 volts. Assuming that circuit 3121 is free, no channel pulse corresponding to trunk 31212 will be appearing over the common channel H2, and no selector will be pulsing over its X111 lead at the trunk 31212 channel impulse times. In switch 31, the marking trunks (MT3121) are joined to the corresponding signalling trunks (S31212). If marking trunk MT3121 is now marked, the effect is the same as if the signalling trunk S31212 had changed to earth potential. As already described, this causes the channel pulse to appear over the common channel, in this case H2. Common channel H3 is joined to channel H2 and to a resistor R11 of a pulse suppression gate circuit (GC in Fig. 6) comprising resistors R11, R12 and rectifier W11. The impulses over channel H3 are positive going with respect to earth and assuming that they pass the gate circuit just described, after amplification they are communicated over the common marking pulse channel SH to all the selectors of the switch 31. In each selector is a starting pulse gate circuit (G11 of Fig. 6) comprising a condenser, *Qcp*, resistors R*cp* and R*fm*, and rectifier W*cp*. When the trunk associated with a selector is free the lead GX111 of the selector is at earth potential. The forward marking trunk M3111 is joined to the selector starting pulse gate circuit and when the trunk potential is negative with respect to earth, the rectifier W*cp* is biased to its high resistance direction so that no impulses can pass over lead GX11 into apparatus shown as a rectangle X11 in the drawing and termed a selector pulse generator X11 (that may be of the form hereinafter referred to). When, however, the forward marking trunk is at earth potential, impulses over common channel SH pass over lead GX11 and one impulse starts inside X11 a pulse generator which generates a pulse coincident with the pulse over lead GX11 which started the pulse generator. At the same time the potential of the lead GX111 is changed from earth to +50 volts, thus preventing any further impulses entering over lead GX11. The apparatus X11 thus responds to only one impulse even though the impulses of many pulses are present on lead SH and even though the marking signal is maintained on trunk M3111, and thus a selector selects one of the free marked circuits on the bank side of the switch and unmarks itself as soon as the selection is made. The pulse generated by X11 is communicated over lead X111 where it operates the two gate circuits or modulators connected to common channels H1 ($R_PR_GR_SW_1W_2$) and H2 (not numbered) and a third gate circuit or modulator (not numbered) which communicates the pulse to a common suppression channel GH. This pulse is amplified and inverted and communicated to resistor R12 as a pulse negative going with respect to earth. As this pulse will now coincide in time with the pulse over channel H3, and the pulse current it produces to earth through resistor R12 is made to exceed the pulse current through R11 from channel H3, the pulse of the particular channel is suppressed from appearing over channel SH. In this way only free bank circuits can be marked over channel SH. In this example, the test trunk T3111 is assumed to have −50 volts potential when the apparatus X11 is free and earth potential when the apparatus is supplying impulses over lead X11 and therefore engaged. The common marking lead ML31 is connected to the anode of a valve V*cm* which is normally cut off. Any marking pulses over lead SH, these being positive going, are lengthened into a continuous voltage by the rectifier, condenser and resistor in the grid circuit of valve V*cm* and cause that valve to take full anode current. The anode is connected to the gate circuits through which link circuits connected to the selector side of the switch can be marked if free. As shown in the contiguous parts of Figs. 9 and 10 of the drawings, trunk 3111 on the selector side of switch 31 are joined to trunks 11211 on the bank side of switch 11. The gate circuit for backwardly marking the link on the bank side of switch 11 is shown in the drawings as comprising the resistors RG11211, RG11212, RG11213, RG11214, rectifier W1121, condenser Q1121, and a valve V9 described later. The resistors of the gate are proportioned so that the following conditions are satisfied. When the link is free, its test trunk T3111 therefore being at −50 v. potential, and with no current in either resistor RG11211 or RG11214, the potential of lead Y1121 from the gate circuit is clamped to −100 v. through the rectifier W1121. Resistor RG11214 is connected to a group marked in the marker as explained more fully later. With T3111 at −50 v. potential and with marker current in either but not both resistors RG11211, RG11214, lead Y1121 is still clamped to −100 v., but with marker current flowing through both resistors, the potential of lead Y1121 falls below −100 v. sufficient to cut off the anode current of valve V9 having its grid joined to lead Y1121 and its cathode to −100 v. With the test trunk T3111 signalling the engaged condition by being at or near earth potential, the potential of lead Y1121 is clamped to −100 v. independently of whether there is marking current in the resistors RG11211, RG11214 or not. Hence the valve V9 will conduct on its anode circuit only if the link is free and marked over both the switch 31 common marker lead ML31 and the group marker lead. The gate circuit just described corresponds to the relays, for example G2121, on the selector sides of the third rank switches of Fig. 7, that is relays which have to be marked from two marking sources before they operate. Where group marking is not required, the group marking resistors (RG11214) may be omitted and the remaining resistors suitably chosen so that the gate circuit can be operated if the link is free and only one marking current is received. The condenser Q1121 has the effect of delaying the operation of the gate circuit after the test trunk has signalled the selector as free and thus preventing a second connexion over the link within a predetermined time after the cessation of a first connexion to give tandem connected switches time to release.

The valve V9 may as shown be connected directly with its grid to the lead Y1121 and is anode to the marking trunk MT1121, its cathode being at −100 v. as indicated by the arms of the switch L in Fig. 10 being thrown over to the left. In that position the grid leak resistor of the valve V10 whose anode is connected to the signalling trunk S31112 is joined directly to −100 v. potential. If the backward marking of switch 11 is the same as switch 31, that is, the backward marking and signalling trunks are connected together within the switch, an alternative and more economical arrangement producing the same result as with two valves is that indicated by moving the arms of switch L to the right. It can be traced from the drawing and the description already given, that the valve V10 is solely under the control of the gate circuit when the link is free and under the control of the backward signalling signals through the multiplexes when the link is engaged, and marks and signals in the required manner. The purpose of the switch L is to show the alternative arrangements described. In practice one or other of these arrangements would be used without the switch L at each switching stage.

The switch 31 as described can be used in any rank of switches in an automatic exchange. The example in Figs. 8 to 15 shows only two ranks of switches, only one link fully connected, that between one switch, 11, in the first rank and switch 31, in the second rank. It will be appreciated however that an exchange of any size may be built up with links between the ranks of switches as described. The forward marking of calling incoming circuits on the selector sides of the first rank switches and the backward marking of called outgoing circuits on the bank sides of the last rank switches will now be described.

*Backward marking free final rank bank circuit.*—Referring first to backward marking of circuits connected to the bank sides of final rank switches, the marking originates from a marker controlled usually indirectly via a register by the called number signals. In this example the marker, the relevant details of which will be described later, normally holds the marker leads of all the outgoing circuits at about 50 volts negative potential relative to earth, and allows the potential of a marker lead to rise in order to mark the associated outgoing circuit.

Referring to Fig. 12, the marker lead for outgoing circuit 3121 is ML3121. The marking trunk for circuit 3121 is trunk MT3121, and interposed between the marker lead and the marking trunk is a gate circuit corresponding inter alia to the relay G21 of Fig. 6. It is assumed that the junction circuit 3121 is so short that speech and signals can be passed over it as for a link circuit, the speech being transmitted on the physical circuits and the signals on the earth phantom circuits as shown in the figure. Hence if the circuit is free, the forward and backward signalling circuits will be at about 50 volts negative potential; if the circuit is engaged, the forward signalling trunk will be at earth potential and the backward signalling trunk may be at either earth or 50 volt negative potential. Taking first the case that the circuit is free, the anode current of valve V121 with the potentials indicated will be cut off, and hence its anode potential will be near +100 v. Potential divider resistors R121, R122 are designed so that with the anode of valve V121 cut-off and no current through rectifier W121 the grid potential of valve V122 is earth potential or higher. However, current normally flows through rectifier W121 from the marker and keeps the potential of the grid circuit at about 50 volts potential. The cathode of valve V122 is connected through rectifier W122 to the forward marking trunk MT3121. When the grid of valve V122 is at earth potential or higher, trunk MT3121 is marked by the cathode circuit. When the grid is at 50 volts or lower the backward signalling trunk S31212 may signal independently of the marking valve V122 due to the presence of the rectifier W122. If the circuit is engaged, forward signalling trunk S31211 will be at about earth potential, valve V121 will be conducting on its anode circuit and resistors R121 and R122 are so designed that in these circumstances the grid of valve V122 is at or below 50 volts potential even without current through the rectifier W121. The marker lead ML3121 is commoned in the marker to the marker leads of all circuits in the same group as circuit 3121, which circuits may be distributed over the final rank switches without restriction as to switch or trunk out of the switch. In Figs. 12 and 15, the marker lead ML3121 is shown connected to the anode of valve V172, which has its cathode connected to 100 volts and is normally conducting; the marker leads of the other circuits in the same groups as circuit 3121 are also connected as indicated by the common symbol to the anode of valve V172.

In operation, valve V172 normally conducts on its anode circuit, the cathode of valve V122 is at about 50 volts negative potential and no current flows into the marking lead MT3121. Assuming now that the marker valve V172 has its anode current cut off, each circuit in the group connected to valve V172 will be marked or not marked in dependence on whether the circuit is free or engaged respectively. If circuit 3121 is free, the grid of valve V122 will assume a potential near earth potential, the valve cathode will be raised to near earth potential and thus mark the circuit over trunk MT3121. If, however, the circuit 3121 is engaged, valve V121 will be conducting on its anode and hence the grid potential of valve V122 will not rise when the marker valve V172 cuts off, and hence the circuit MT3121 is not marked. The rectifiers W121 decouple from one another the gate circuits of the group of circuits, which gate circuits can thus operate or not independently of one another.

The series resistor and shunt condenser combination in the grid circuit of valve V121 delays the response of valve V121 to signals over the signal trunk S31211; in this way a circuit is prevented from being marked free until a minimum time elapses after it is released from a previous call, in order to give tandem connected circuits time to release, as is well understood in the art: This feature is one reason for the provision of the gate circuit which controls the backward marking. During the time that a selector apparatus X11 (Fig. 10) is pulsing and connecting a trunk on the selector side to the trunk on the bank side, marking of the trunk on the bank side is prevented by the pulse suppression pulse which is supplied from the apparatus X11 over the lead X111 to the common channel GH. A second reason for the provision of the gate circuit V122 etc., Fig. 12, is that it enables one multiplex to be used for both signalling and marking.

(2) *Switch 32.*—In an alternative arrangement which is suitable in some applications, the gate circuit is omitted, and separate signalling and marking multiplexes provided. This is indicated in Fig. 5 and in more detail in the lower half of Figures 10 and 11, by a switch enclosed in the rectangle 32, the trunks on the bank side of which are connected as shown in Fig. 12, to subscribers' lines. Referring to Figs. 11 and 12, the speech channels 32211 and 32212 are connected through a hybrid transformer T12 to the subscriber's two wire line. A condenser C12 is provided between the two halves of the 2-wire winding of transformer T12. To one side of the condenser is connected, via a resistor, a 50 volt battery, the negative pole of which is earthed, and to the other side of the condenser is connected the backward signalling trunk S32212 and earth via a resistor R12 and a condenser C11 in parallel. The subscriber's station apparatus is assumed to be the usual type which presents an open circuit to D. C. currents when the handset is resting on the cradle switch and a low-resistance D. C. loop when the handset is taken off the cradle switch. Movement of the cradle switch has the effect of changing the potential of the signalling trunk S32212 and this controls the signals through the speech and signalling multiplex connected to the common channel H2 of switch 32 in Figure 11. This multiplex may be the same as the multiplex connected to the common channel H2 of switch 31 except that a small change is needed to allow for the signals applied to the backward signalling wires being slightly different. The difference may conveniently be the value of the bias resistor providing bias current to the backward speech trunk channel modulator. The resistor is preferably arranged to be such that either of the two values can be readily provided for each channel in the backward speech multiplex of switches of both types 31 and 32. With this arrangement junctions with their gate circuits (valves V121, V122) may be connected to switches of the switch 32 type and subscribers lines, each with a gate circuit, may be connected to switches of the switch 31 type. The subscriber line 3221 is marked over marker lead ML3221 by a signal from the marker similar to the marker signals described for the marker leads associated with switch 31. The marker leads of switch 32 are connected to a marker multiplex similar to, but separate from, the speech and signal multiplex, and connected to a common channel H3. The marker pulse of a trunk connected to the bank side of switch 32 will or will not appear over channel H3 in dependence on whether the marker lead of the trunk is marked by being at earth potential or unmarked by being at about 50 volt potential, respectively. The part of the switch 32 which would appear in Fig. 10 has not been drawn in detail as it is identical with the part of switch 31 which appears on Fig. 10, the common channels $H_1$, $H_2$, $H_3$ of switch 32, Fig. 11, joining each to each to common channels $H_1$, $H_2$, $H_3$ as shown for switch 31, Fig. 10. The operation of switches such as switch 32 in the setting up of calls is the same as that described for switch 31 in that the marker marks all the marker leads of a group of circuits in response to called number signals, marking pulses for all free circuits are transmitted over a common channel SH, and a marking pulse or pulses over a channel SH are lengthened into a continuous mark over the common marker lead ML32 for the switch.

(3) *Forward marking-, bridge-, register-, and marker-circuits.*—Turning now to the calling side of the exchange, and referring in particular to Figs. 8 and 9, incoming circuits are connected on the bank sides of line-finder switches, G that may take the same form as switch 31 and of which one, O1, is shown. The trunks on the selector sides of the line-finder switches are connected to the trunks on the selector sides of first rank switches by bridge (a suitable form of which is described at the end of this section of this specification) circuits, each of which includes a bridge. In Fig. 8, trunk O1211 on the selector side of line-finder O1 is connected through bridge BO121 to the trunk 11111 on the selector side of the first rank switch 11. These connections through the bridge are shown by dashed lines to indicate that the connections are not actually made until after the selection which is the subject of this invention, has been made. The connections which are material to this invention are indicated by the full line connection of the signalling trunk SO1211, the forward signalling trunk S11111, both of these being D. C. signalling trunks similar to those described for the link circuits, and an audio frequency trunk SBO121 through the register-finder switch 500 to a register 600. These connections are made automatically when an incoming circuit calls. The calling circuit then transmits over the signal trunk SO1211 into the register the called number signals, in this example by dialling impulses. When the register has received sufficient called number signals to define the connection required through the exchange, it obtains connection through a marker connector 700 to the marker, of which there is only one which can be used at any one time in the exchange, and only one register can be connected to the marker at any one time. The parts of the marker relevant to this invention are shown in Figs. 14 and 15. In this example the connection between the register and the marker is shown as comprising a group of leads RC2 which after passing through the marker connector 700 becomes a group of leads MC2 to correspond with the designations of Fig. 7, and an audio channel RC13 which after passing through the marker connector becomes channel MC13, this channel corresponding to both RC1, MC1, and RC3, MC3 of Fig. 7. An A. C. signal of frequency $f_1$ when transmitted over the channel MC13, RC13 is selected by the band-pass filter $f_1$ in register 600, rectified and applied to the grid of the valve VS600 to cut-off the anode current of that valve. The anode potential then changes from about minus 50 volts to earth potential and this signal appears at the forward marking trunk S11111 and thus marks the calling circuit. Other audio frequency signals transmitted from the marker over channel MC13 and RC13 appear in the bridge BO121 over channel SBO121 and perform operations which are described later.

The communication of called number signals from the register 600 over the marker connector 700 to the marker is assumed in this example to be effected by D. C. signals over the leads RC2, MC2. For four-decimal digit numbers, for example, four groups of ten, leads may be provided, the leads being terminated in the marker in relay or other apparatus indicated by dashed lines and connected to a —50 volt supply. A number is communicated by earthing, as shown in the drawings by relay contacts, one lead in each of the four groups of leads. As a consequence of this signal received into the marker, the group of outgoing circuits designated by the called number signals are indicated by relay contacts, for example the contacts connected to the grids of valves V171 and V172, and a signal is passed in this case over the channel MC13, RC13 as already described, to the calling trunk. Referring to Fig. 15, the two valves V171, V172 are shown with their grids and cathodes at —100 v., the valves therefore being normally conducting on their anode circuits, but with their grids each connected through a normally open contact to a —110 volt potential which when applied to the grid of valve V171, or V172 would cut off anode current. A relay contact is operated when the called number signals received correspond to the number of the group of circuits having their marker leads connected to the anode of the valve to the grid of which the contact is connected. The connection of calling circuits through bridges, bridge finders to registers, the connection of registers to markers and the signalling between markers and registers, the marking of a called group of circuits designated by the called number signals and the marking by the marker and over intermediate apparatus of calling circuits is well-known in the art.

*"Appropriate" link marking*

At the same time that the marker marks the called group of outgoing circuits, in this example it is required to provide a link group marking which selects which of the link circuits may be used for the connection being set up. This is indicated in Fig. 14 by the contact connected to the grid of the valve VLM1. The anode of valve VLM1, which is normally not conducting anode current, is connected over a group marker lead to the gate circuit of all link circuits of a type suitable for a particular type connection being set up. As previously described, no link circuit can be marked unless its group marking lead is marked by current through the group marker lead; for example, trunk Y1121 (Fig. 10) is not marked over backward marking trunk MT1121 unless current is drawn through resistor RG11214. There is a group marking valve similar to VLM1 for each type of connection which can be set up, and for each called number received into the marker one of the valves is marked by being made to draw anode current.

Referring now to the several elements shown in Figs. 8–15 as rectangles, these elements may be of any known or suitable form for performing the functions above described in response to the stimuli mentioned.

For example, the selector pulse generator XII, as explained in connection with Figs. 5 and 6, above, may be of any suitable type that (1) receives a pulse through a pulse injector gate in lead GX11, (2) emits over lead X111 an impulse coincident therewith, and further impulses thereafter at intervals equal to the multiplex cycle time, (3) applies a change of potential over lead GX111 to prevent admission of further impulses through the pulse injection gate, and (4) applies a change of potential to test trunk T11 (T3111, Fig. 10) to signal its engaged condition. Such a synchronous pulse generator is shown, for example, in Fig. 3*c* of copending application Serial No. 56,619 (Flowers) together with other apparatus not concerned in switch 31 herein, namely: the equipment to the right of the broken line in said Fig. 3*c*, which serves other functions, and which may be eliminated, together with the leads M1, M2 and M10, retaining only the earth connection of the junction of resistors R44 and R45 therefrom; the lines SR and SG of said Fig. 3*c* which are replaced by the lines S31111, 31111, 31112, S31112 in switch 31 and thus may be eliminated; the circuit R, 42, 44, T5 of said Fig. 3*c* which is replaced in Fig. 31 hereof by circuit H1–31111 and thus may be omitted.

The pulse generator of said Fig. 3*c*, thus stripped of extraneous circuitry, may be employed in block X11 of switch 31 as shown in Fig. 17 as follows:

(1) The grid of gate 41 Fig. 3*c*, which is energized by the channel pulse of the calling circuit G corresponding to circuit H2 in switch 31 herein, is correspondingly connected to the circuit $H_2$ where circuit $H_3$ branches therefrom, i. e. the input condenser of lead G (Fig. 3*a*, adjacent tube 33) is connected to such branching point.

(2) Lead C of said Fig. 3*c* that receives the admitted selector pulse, is connected to the corresponding lead GXII in switch 31, causing the associated pulse generator 40, 45—48 DL, 49—50, D4, D5—45 to emit over lead C47 (connected to the anode of tube 45) an impulse coincident with the impulse received through C, and further impulses thereafter at intervals equal to the multiplex cycle time.

(3) In said Fig. 3*c*, the generated series of pulses is negative going and is repeated by repeater 43 to impart to it the proper D. C. level and phase to operate the gate 41 by lowering its cathode potential. As positive going pulses are wanted on lead XIII in switch 31, the repeater is selected to deliver such, and may be a repeater of the type shown at 19 in Ransome Patent No. 2,512,676 that has both anode and cathode loads for producing both positive going and negative going output pulses for connection respectively to lead X111 and to tube 41.

(4) (5) While the selector pulse generator of Serial No. 56,619 is engaged, it provides a positive-going rise of potential at the anode of tube 51 therein, developed across the potentiometer or tapped voltage divider R58—R59 therein. The voltage changes required for leads GX111 and T3111 herein are thus available at the anode end and intermediate tap of said potentiometer, and are applicable by connecting the junction of resistors R63 and R58 to lead GX111 and the junction of resistors R58 and R59 to lead T3111, the various biasing potentials and timing pulse leads $K_1$ and $K_2$ being connected as set forth in said application Serial No. 56,619.

Turning now to the other elements shown in block diagram in Figs. 8–15: switch 32 of course is a duplicate of switch 31, except for the modifications shown and already described; switch 11 may be a duplicate of switch 31, in the same orientation; switch O1 may be a duplicate of switch 32 reversed end for end; and switch 500 may be a dpulicate of switch 31 reversed end for end.

It will be appreciated that in the present arrangement the signals are pulse modulated in time division multiplex fashion within the individual electronic switches wherever said switches are employed, but that the signals in the linking circuits between switches—e. g. circuits O1211, O1212 Fig. 8; 11111 and 1112 Fig. 9—are not pulse modulated and correspond to ordinary telephone line signals, while the marking signals associated therewith—e. g. SO1211, SO1212 in Fig. 8 and S11111, S11112 in Fig. 9—are D. C. signals in the embodiment disclosed. It will accordingly be clear to those skilled in the art that the features of the present invention may be used in part of the system while conventional elements continue to be used in other parts thereof, wherefore the bridge circuit BO121, Fig. 8, the register finder 500, and the register 600, or even the switch O1, may be of any conventional or special form. One conventional form that may be employed for these elements is that used in the British director system and disclosed in "Telephony" by Atkinson, London, Sir Isaac Pitman and Son, vol. II, ch. XIII, in which the functions of line finder O1, bridge BO121, register finder 500, and register 600 are performed by the subscriber's uniselectors, the first code selector including the bridge (relay KRO and the register finder (A-digit hunter) which register-finder connects the director corresponding to register 600 to the bridge circuit. The bridge-circuit therein, as in the present case, is a piece of apparatus included in a connection through an exchange comprising registers. When the bridge-circuit therein, and here, is first picked-up by an originating call, the inward and outward sides of the bridge-circuit are disconnected from one another, but are connected to a register, therein, and here, through a register-finder. The called number is communicated to the register over the inward trunk connection, the register sets up the required connection over the outward trunk and thence over the exchange switches to a called line, then the inward and outward connections are bridged, i. e., joined together, in the bridge circuit, and the register released.

Another conventional form that may be employed for the just mentioned elements is that used in the American Cross-Bar System and disclosed in British Patent No. 466,986 communicated to Standard Telephone and Cable by the Western Electric Company, in which the functions of the line-finder O1 are performed by the equipment in Figs. 14 and 15; those of the bridge circuit BO121 by the district trunk equipment of Fig. 17 and those of the register finder switches 500 by the switches 1800 and 1802 which connect the district trunk equipment to a register called therein a subscriber register sender. The patent also contains a second embodiment of these features, namely for incoming junction calls, with the bridge-circuit in the incoming trunk circuit of Fig. 45, the register finder, called a sender selector, in Figs. 43 and 44, and the register, called a terminating sender, in Figs. 46–47.

The system of the just mentioned British patent like that of the present case, operates through a marker connector. The marker-connector herein is designated 700 (Fig. 13). In the British patent the first mentioned marker connector (Figs. 27 and 28) connects the register (Figs. 22 to 26) to a marker (called, in the patent, an originating decoder marker and shown in detail in Figs. 29 to 40). And the second mentioned marker connector, called a terminating decoder marker connector (Figs. 48 and 49) connects the register called a terminating sender (Figs. 46–47) to the marker called a terminating decoder marker (Figs. 50–56). In each instance a number stored in the register is sent over the marker connector to the marker which "decodes" the number to a mark over a single wire designated by the number, thus performing the same function as the marker in the present case. This matter is fully described in said British patent, and in more easily read form in an article entitled "Number decoding by terminating markers" by J. W. Dehn, Bell Laboratories Record vol. 17, page 356, July 1939.

The only changes needed to adapt such conventional equipment to the present combination are fully set forth in Fig. 7 and in Figs. 8–15 herein, and specifically indicated and described in the case of the bridge circuit BO121 and the register 600, in connection with Figs. 8, 9, 13 and 14 herein.

To further clarify these matters, Figs. 18 and 19 herein designate diagrammatically the adaptation of the said known bridge, register and marker circuits of the British director system (Atkinson book) and of the cross-bar system (British Patent No. 466,986) respectively, to serve as the block elements of Figs. 8 and 13 of the present system.

Thus, Fig. 18 depicts in outline the circuit of apparatus in the British director system and explained in detail in the Atkinson book as follows:

With reference to the boxes in Figs. 8 and 13 of the drawings of the present specification and to the page and figures of the Atkinson book, as indicated in Fig. 18 herein, box O1 is the linefinder page 245, Fig. 279; box BO121, the bridge-circuit, is part of the 1st code selector, page 388, Fig. 395; box 500 the register-finder is the 'A' digit hunter, page 388, Fig. 395; while box 600, the register, is made up of a combination of the 'A' digit selector page 391, Fig. 396 and the director pages 396 and 397, Fig. 398, with details of storage of dialed information given on page 394, Fig. 397. The hybrid transformer used to convert the two-wire speech path to a four-wire circuit (11111 and 11112) is found on page 659, lines 9 to 11 second column and Fig. 650.

The director system does not include a marker, as the director in its normal function sends pulses back to the 1st code selector. For this scheme the marker connector (700) of course takes the form of a linefinder of which there are many types, one being shown for the box O1.

The linefinder (O1) in Atkinson page 245, Fig. 279 is the absolutely standard circuit. The negative and positive leads form the two-wire speech path and also the forward hold circuit and therefore incorporate the leads SO1211, O1211 and O1212 of Fig. 8 of the present application.

The bridge-circuit (BO121) as above noted is part of the 1st code selector circuit shown in Atkinson book at page 388, Fig. 395. It should be remembered that the 1st code selector as such, consists of a two-motion selector plus a bridge-circuit and that in its operation in a director system, the 1st code selector wipers are positioned in the vertical and rotary directions by pulses returned from the director. That function is not required in connection with this case and is the reason that it is the portion of the circuit appearing on page 388 that is used although certain elements from page 389 are incorporated.

In Atkinson, as indicated in Fig. 18 the negative and positive leads incoming terminate on capacitors QA and QB forming the bridge, and are also connected to battery and earth via the coils of relay L. The negative and positive leads on the other side of the capacitors go to the outgoing side via contacts KR2 and KR3. These contacts are operated thus breaking the bridge circuit during the setting up of the connection by the marker and also release and complete the bridge when the marker is released. Thus they are equivalent to the dotted lines as shown in Fig. 8 of the present specification.

The outgoing negative and positive leads from the bridge circuit of Atkinson are joined to a hybrid transformer, as shown in Atkinson on page 659, lines 9 to 11 in the second column, and Fig. 650, in order to connect to the four-wire speech circuit shown as 11111 and 11112 in Figs. 8 and 18 herein.

Each 1st code selector has its own 'A' digit hunter (ADH) and this forms the register finder (500) of Figs. 8 and 18 herein. The operating circuit of this switch is taken from page 389, a modification being made, in that C6 of Fig. 395 is replaced by LR2 contact, because relay C is not used and LR2 is not required in the D and I loop circuit normally forming the forward hold of a 1st code selector and not required with the system of the present invention which has a separate forward marking trunk (S11111). Incoming dial pulses control L relay and L1 contact repeats. These pulses via KR5 operate to the PU wire, which therefore corresponds to lead SO1211 outgoing from bridge circuit in Fig. 8 herein.

The first dialled digit is received by the 'A' digit selector (in effect part of the director) see page 391, Fig. 396, which connects to the director proper. The director, pages 396–397, Fig. 398 corresponds to the register (600) of Fig. 8 herein and stores the remainder of the dialled information. Relay A responds to the pulses and controls storage switches such as V, R, M, C, D and U, page 394, Fig. 397. These switches mark the leads (RC2) which connect, on leads MC2, to the marker when it is free, by means of a linefinder arrangement on similar lines to that shown for box O1 and corresponding to the marker connector (700) of Fig. 8 herein.

The marker provides the forward marking signal (earth) on lead MC13 and then via the marker connector to lead RC13 in the director, to lead FR in the register finder and so to the bridge circuit, where via KR1 contact relay M is operated. Relay M locks via its other coil and M6 contact to L1. This locking circuit to L1 is a minor modification of the circuit of the 1st code selector, Fig. 395. M2 connects earth to the forward marking trunk S11111.

The backward signal trunk S11112 is connected via LR1 operated to relay B. This is a minor modification in the 1st code selector, relay B not being used in its normal manner. Contacts of relay B obviously could extend the signal to the linefinder O1 as in Fig. 8 herein if necessary or desired but such extension is not shown in Fig. 18. In that case the P wire between the bridge circuit and linefinder would correspond to the lead marked SO1212 in Fig. 8 herein. When the marker releases, relays K and KR in the bridge circuit release, and KR 2 and 3 contacts complete the bridge circuit.

Similarly Fig. 19 follows the same lines in principle as Fig. 18, but applies to the cross-bar system as described in British Patent No. 466,986 and the reference figures and numerals within the boxes relate to that patent, while the box descriptions are the same as those in Figs. 8 and 13 herein. Thus:

The linefinder (O1) connects the bridge circuit (BO121) by a two-wire speech path 1434 and 1435 which also forms the forward hold, and is equivalent to SO1211 in Fig. 8 herein.

The bridge-circuit is connected via primary and secondary selector switches 1800 and 1802, forming the register finder (500) to a register (600) where relay 2207 responds to the dial pulses. The dialled information is stored in the register and contacts of relays 2220 and 2221 complete the circuit via operated register storage switches to mark the leads RC2 via marker connector switches 2700 and 2702, forming the marker connector (700) to leads MC2 to the marker.

The marker connects earth to lead MC13 via marker connector switches 2802 and 2810 and lead RC13 to operate relay 2232 in the register. A contact of relay 2232 switches the marker lead RC13 into the bridge circuit to operate relay 1712. A contact of relay 1712 marks the forward marking trunk S11111. When the marker releases relay 1707 is operated in the bridge circuit and contacts of relay 1707 complete the bridge circuit.

The outgoing speech pair 1722 and 1723 of the bridge circuit are connected via a hybrid transformer to the four-wire circuit 11111 and 11112, in known manner as indicated.

It should be noted that in Figs. 13 and 14 of the present case, RC13 and MC13 are a pair of wires and that RC13 terminates on a filter circuit ($f1$) and valve VS600 in the register (600), the output of VS600 being the forward marking trunk. RC13 in register (600) is also teed off to filter circuits $f1$ and $fT$ (SBO121) in the bridge circuit (BO121) of Fig. 8. This combination is fully described under (3) just above, and in the following description of typical operation, as used for marking by A. C. for various conditions, such as forward marking from the marker, different 'busy' conditions and 'bridge transfer' facility, and hence for simplicity has not been incorporated in Figs. 18 and 19.

*Typical operation (Figs. 8–15)*

(1) *Normal operations.*—Let it now be assumed that the called number signals have been received into the marker, from register 600 connected to bridge BO121, that the called number signals designate an existing group of circuits at least one of which is free, and that a free path exists for a connection to be made from the calling to one of the free called circuits. A valve, assumed to be V172, will be cut off by the marker to mark the called group of circuits. The free circuits in the called group will be marked and the switches to which they are connected will mark their common marker leads (ML), which in turn will mark free link circuits at the bank side of the first rank switches. Let it further be assumed that the marker is marking the forward marking trunk S11111 by transmitting a signal frequency $f_1$ from generator $f_x$ and thus cutting off the anode current of valve VS600 in the register. Then, when at least one trunk is marked on the bank side of switch 11, the switch will connect the trunk 1111 to one of the trunks marked on the bank side, say trunk 1121. By the connection together of the forward marking trunks S11111 and S11211, the forward mark on trunk S11111 is extended to forward marking trunk S31111, and a connection is then made through switch 31 to a circuit marked on the bank side of the switch. Selection is then complete and the marker may be released. When the marker is released the mark is taken off the forward marking trunk S11111 and hence off the forward marking trunks of all the trunks connected through the switches to trunk S11111. Prior to this, however, each selector in the connection will have unmarked itself as already described by changing the potential of its GX111 lead from earth to +50 volts. The condition of the signalling trunks which carried the marks through the switches can then have no effect on the marking. Hence the forward signalling trunks may be used after the connexion has been set up through the switches for other forward signals which are required through the switches, for example, to control the release of the connexion, and may be connected through the bridge to the forward signalling trunks from the line-finders when the registers release. It is for this reason that the forward signalling trunk SO1211 is shown by dashed line as connected through the bridge circuit to the forward signalling trunk S11111.

(2) *Dialed number unobtainable.*—In addition to, or in place of the operations already described, the following operations may occur. The marking leads MC2 are commoned through decoupling rectifiers DR to the grid of a valve V177 having its cathode earthed. This valve is normally cut off at its anode but conducts if any one of the leads MC2 is marked with earth potential; this valve therefore conducts when any number is communicated to the marker. Change of anode potential of valve V177 is communicated by a resistor network to the grid of valve V173 such that when valve V177 is cut off valve V173 conducts on its anode, and when valve V177 conducts valve V173 anode tends to cut off after a time delay produced by the condenser C15 connected between the grid of valve V173 and earth. The cut off of valve V173 can be arrested by the cathode of valve V174 which is normally at about −50 volts potential, rising to about earth potential. This occurs when any called group marking valve (V171, V172) anode rises to earth potential, the anodes of all the called group marking valves being connected via decoupling rectifiers DR15 to the grid of valve V174. If therefore the called number signals received into the marker designate an existing group of outgoing circuits, valve V173 remains conducting. If, however, the called number signals designate a non-existent group of outgoing circuits, valve V173 cuts off its anode current after a brief delay. Its anode marks circuits to which N. U. (number unobtainable) tone is connected to the backward speech trunk. The calling circuit is thus connected to one of these circuits, assuming one to be free and available to the calling circuit, and the calling circuit is thus signalled that the called number is unobtainable.

(3) *Called circuit busy.*—Each switch having outgoing circuits connected to its banks has its common marker lead connected through a decoupling rectifier DR31, DR32 to the grid of a cathode-follower valve V175 such that when no free outgoing circuits are marked the grid of valve V175 is at −100 volts potential, but any one outgoing circuit marked causes the potential of the grid of the valve to fall to about −150 volts. The cathodes of the two valves V175 and V174 are connected by two resistors R150, R151 in series and designed so that the potential of the junction of the two resistors is well below −50 volts when the cathode of valve V174 is at −50 volts potential and the cathode of valve V175 is at −100 volts potential, and also when the cathodes of valves V174 and V175 are at earth and −150 volts potential respectively, but the potential of the junction of the two resistors is clamped to −50 volts potential when the cathodes of valves V174 and V175 are at earth and −100 volts respectively. These potentials correspond, as can be followed from the description already given, to the condition that the mean potential of the grid of valve V176 which is connected via a resistor R152 to the junction of the two resistors R150 and R151 is well below −50 volts potential except when at least one outgoing circuit marker lead is marked but no outgoing circuit is marked as free, that is, to the condition that there is an existent group of called circuits but none is free. In this condition valve V176 which is normally cut off, conducts on its anode circuit and transmits from the signal generator *f*TB over the channel MC13 a signal to the calling bridge circuit that all called circuits are busy. The condenser C16 connected between grid resistor of valve V176 and the rectifier clamp to −50 volts potential delays the change of means grid potential of the valve in order to cover the difference in time between the marking by the marker of an outgoing circuit marker lead and the marking if there is a free outgoing called circuit of a final rank switch common marker lead.

(4) *No free link.*—The cathode potential of valve V175 changing from −100 volts to about −150 volts indicates that there is a free circuit in the called group of outgoing circuits. There may not however be a free link over which the call can be completed. This is detected by the apparatus which includes valves V151 and V152 shown in Fig. 14. Valve V151 is arranged to be normally conducting on its anode circuit and thus by means of resistors R140, R141 to keep the mean potential of the grid of valve V152 well below earth, which is the potential of the cathode. The connection via resistors R142, R143 of the grid of valve V151 to the cathode of valve V175 causes the grid potential of valve V151 to tend to be reduced when an outgoing circuit is marked and the cathode potential of valve V175 is thereby reduced from −100 to −150 volts. The change of grid potential of valve V151 is delayed by the condenser Q151 but if the cathode potential of valve V175 is maintained at −150 volts and no other control is exercised, the valve V151 will after a predetermined time delay cut off. Th mean potential of the grid of valve V152 is then clamped by rectifier DR14 to earth potential and the valve then amplifies a signal from the generator $f_B$ and applies it to the channel MC13 and thence to the calling bridge circuit. The predetermined time delay may be arranged to be longer than the time needed to complete a connexion so that if there is a free link the call will be completed and the marker released before valve V151 is cut off. Alternatively if the valve V151 is cut off the signal $f_B$ is given to the calling bridge and can there produce the appropriate action. The pre-determined time delay may in practice be very long and means to reduce it by further signals will be described later.

Description has been given of a call for a non-existent group of outgoing circuits being routed to N. U. tone circuits, a call for a group of outgoing circuits all of which are busy being signalled from a signal generator $f_{TB}$, and a call for which there are free outgoing circuits but no free links being signalled from generator $f_B$. The signals given by generators $f_B$ and $f_{TB}$ may be the same, for example, the common busy signal, or they may be different to indicate to the register and bridge the cause of failure to complete the connection.

*Bridge transfer.*—It was assumed in the previous description that the generator $f_X$ transmitted a signal $f_1$ which caused the forward marking trunk S11111 of the calling bridge circuit to be marked. Description will now be given of an alternative arrangement in which a test is first made to determine whether a connexion can be made from the bridge circuit already held, from another bridge circuit to which the calling circuit has access or not made at all and appropriate signals given. Let is be assumed now that the marker marks an existent group of outgoing circuits, at least one of which is free, group marks the links, all as previously described, but that the signal sent out from generator $f_X$ is not the $f_1$ signal but a so-called identity audio frequency of signal $f_1$. The forward marking trunk S11111 will not then be marked as previously described, but the identity signal will pass into the calling bridge circuit over the channel SB0121, will then pass a band-pass filter $f_1$ and thence over a second forward marking trunk and via decoupling resistors R9, to a gate circuit comprising the two transformers T91 and T92 and rectifiers W91 and W92. This gate circuit, which corresponds to the relay GP of Fig. 7, is common to all the bridge circuits terminated at one end on switch 11. Hence the appearance of the identity signal at the gate circuit indicates that the calling circuit is connected to switch 11. The common marker lead ML11 when unmarked is at a potential of about −100 volts, and this is arranged to produce high attenuation through the gate circuit. If the common marker lead is marked the lower potential causes low attenuation through the gate circuit; and if the common marker lead is marked it signifies that connection to a free called circuit can be made over the switch 11. Hence if a gate circuit receives both the identity signal and a mark from the common marker lead, it signifies that a free path exists from the calling to a free called circuit; the gate circuit passes the identity signal via decoupling resistors R14 to a channel CGP common to all gate circuits associated with first rank switches. The identity signal over channel CGP is amplified and rectified at DR16 and used as will now be described.

The rectified identity signal may be applied to the gate circuit comprising valves V151, V152 as a positive signal to arrest the cut-off of valve V151. By this means the delay in cutting-off valve V151 may be very short and sufficient only to cover the time taken for the link marking to operate.

The rectified identity signal may be applied to a gate circuit comprising the transformer T141 and A. C. generator $f_1$. The gate circuit is arranged so that normally there is a high attenuation between the generator $f_1$ and the channel MC13, but when the rectified identity signal is applied to the gate circuit, there is low attenuation between the generator $f_1$ and the channel MC13. In this way the free path signal over channel CGP causes the forward marking signal to be applied to the calling bridge circuit and the connection will then be completed as previously described.

Although there may not be a free path from the calling bridge circuit to a free called circuit, there may be a free path from the calling circuit on the bank side of the line-finder to a free called circuit and this is detected as will now be described. The identity signal which passes the band pass filter $f_1$ in the bridge circuit is communicated via decoupling resistors R90 to a gate circuit comprising transformers T93 and T94 and rectifiers W93 and W94. This gate circuit which corresponds to relay CT of Fig. 7 is similar to that previously described as comprising transformers T91 and T92, but the bridge circuit channels from filters $f_1$ are commoned to the two gate circuits in a different order. To the gate circuit comprising transformer T93 are commoned the channels from all the bridges in links having one end terminated on the same line-finder switch, in this case the line-finder switch 01. Hence the identity signal when it reaches a gate circuit designates the line-finder to which the calling circuit is connected. The gate-circuits for the bridge circuits have their backward marking trunks e. g. MT0121 for bridge circuit 0121, commoned via decoupling rectifiers DR9 to the gate circuits corresponding to the line-finders on which the bridge circuits terminate. When a backward marking trunk is marked it opens the gate circuit to allow the passage of the identity signal if it is also present at the gate circuit. If it is present, it signifies that a free path exists from the calling circuit on the bank side of the line-finder to a free called circuit. The identity signal which passes the gate circuit is commoned via decoupling resistors R91 to a channel CGT common to all similar gate circuits, and thence passes to a gate circuit corresponding to relay GMT of Fig. 7 and comprising transformers T142 and T143, and rectifiers W142 and W143. To this gate is also connected the output from the rectifier DR16 previously described as following channel CGP and its amplifier. When the output from this rectifier is zero, transmission from the channel CGT to the modulator M141 suffers little attenuation, but the attenuation is greatly increased by a D. C. output from the rectifier. Assuming that there is a free path from the calling bridge to a free called circuit, transmission from channel CGT to modulator M141 is effectively prevented. Assuming however that there is no said free path, but there is a free path from the calling circuit on the bank side of the line-finder to a free called circuit, the identity signal which appears over channel CGT passes the gate circuit to the modulator M141. The modulator is also provided with a carrier supply at frequency $f_y$ such that one of the useful modulation products is a frequency $f_T$ which, selected by a band-pass filter $T_1$ amplified and applied to the channel MC13, is transmitted into the calling bridge circuit, detected there by a filter $f_T$ and other apparatus not shown in the drawing, and utilised in the bridge circuit to initiate a transfer operation whereby the connexion from the calling circuit on the bank side of the line-finder is transferred to a bridge circuit having a free path to a free called circuit. Means for effecting the transfer operation are fully described in copending patent application Serial No. 117,822 filed September 26, 1949.

After transfer, the call is completed as previously described for a call having a free path from the calling bridge circuit to a free called circuit. The delay introduced by condenser Q151 in the application of the signal $f_B$ in the case that a free called circuit but no suitable free links are available should be greater than the time taken to effect a transfer operation and signal that a free path then exists.

It will be evident without detailed description that the identity signal over channel CGP may be recified to produce a negative going voltage signal which may control a gate circuit similar to that comprising valves V151 and V152 such that if the call has not been completed within a predetermined time after the signal is given that there is a free path from the calling bridge circuit to a free called circuit, a signal is given to indicate a fault in the operation of the exchange apparatus.

As already stated, where specific voltages are mentioned these are given by way of example to facilitate explanation. The polarities of pulses may equally well in many cases be the opposite of that described, provided that suitable alterations to the circuit elements are made, for example, that valves which are normally conducting and cut-off to signal, are made cut-off and conducting to signal respectively. The gate circuits which are described may be substituted by any known form of gate circuit capable of performing the same function. In some special cases, gate circuits may be substituted by a device having the same effect but not generally recognised as a gate circuit; for example, a gate circuit by means of which a signal at one frequency is converted to a signal at a different frequency, may be a conventional or a frequency changing modulator, both of which are described in the foregoing description.

Although in the preceding description reference has been made to speech circuits, it will be understood that the invention is applicable to similar circuits such as telegraph circuits.

I claim:

1. An automatic telephone exchange line selecting system comprising a marker and at least one switch having at least one set of selector terminals for connection to a speech trunk, a signal trunk and a forward marking trunk and at least one set of bank terminals for connection to a speech trunk and a signal trunk, a marker lead associated with each set of bank terminals, means for signalling the condition free or engaged of the speech trunk connected to each set of bank terminals, means responsive to a mark on a marker lead for backwardly marking the associated speech trunk if it is signalled to be free and in which each switch is provided with a common backward marker lead and means for marking the same when at least one speech trunk on the bank side of the switch is marked, said system further comprising link circuits connecting successive ranks of switches, each link circuit comprising leads connecting the speech and signal trunk terminals of a set of bank terminals of a switch in one rank to the corresponding speech and signal trunk terminals of a set of selector terminals of a switch in the next higher rank; said system further comprising means for marking the marker leads of a group of bank terminals designated by called number signals communicated to the marker, means for communicating called number signals received over a calling incoming circuit to the marker and means for marking the forward marking trunk of the calling circuit, the common backward marker lead for each switch being connected to the marker lead of each speech trunk in a previous rank of switches connected over a link circuit to the switch and each forward marking trunk being connected to a corresponding signal trunk.

2. A switch having a selector side, a bank side, and a common bus section therebetween, the selector side comprising a plurality of selector circuits each presenting outwardly extending speech and signal entry trunk means and speech and signal exit trunk means for conveying signals to and from the switch, the bank side comprising a like plurality of bank circuits each presenting outwardly extending speech and signal entry trunk means and speech and signal exit trunk means 31211 and S31211 for conveying signals to and from the switch, and each of said selector and bank circuits having at its inner end entry trunk and exit trunk gating means; the gating means of the several bank circuits each being operable in time division multiplex sequence with a different time division channel for each bank circuit, and the gating means of the several selector circuits each being operable on any selected one of the said time division channels; the common bus section comprising common bus means for receiving gated signals from any number of the bank circuits, each as channel pulses on its own time division channel, and presenting the same to the exit gating means of all the selector circuits, and the bus section further having a common bus for receiving gated signals from any number of selector circuits, each as channel pulses on its selected time division channel, and presenting the same to the exit gating means of all the bank circuits; each bank circuit comprising means responsive to a signal entering through its signal entry trunk means for initiating the production of the channel pulses on its own time division channel; each selector circuit comprising means responsive to a signal entering through its signal entry trunk means and to one of the channel pulses of a bank circuit for operating the gating means of each selector circuit in synchrony with the channel pulses of said bank circuit thereby to establish communication between the bank and selector circuits by synchronously gating them to the common buses; the means responsive to a signal entering through the selector circuit and to channel pulses of a bank circuit comprising a synchronous channel pulse generator having a pulse injection gate conditioned, by a marking signal on a signal entry trunk of the selector circuit, to admit a bank circuit derived channel pulse for initiating pulse generation in synchrony with the pulse channel of the bank circuit for operating the gating means of the selector circuit in synchrony with that of the bank circuit; the common bus means comprising a first bus that presents the channel pulses from the bank circuits to the exit trunk gates of all selectors and a second bus H3 that presents the channel pulses from the bank circuits to the injectors of the synchronous pulse generators; each selector circuit further comprising means responsive to the synchronously generated pulses for suppressing transmission of like pulses through said second bus of the common bus section; the switch further comprising a common backward marker lead, and means responsive to channel pulses being transmitted through said second bus for applying a marking signal to said common backward marker lead.

3. A switch according to claim 2; each selector circuit further comprising means energized on operation of its synchronous pulse generator to indicate its engaged condition, and means for blocking a transmission of the marking signal on said common backward marker lead in response to an engaged condition signal from said indicating means.

4. A switch according to claim 3, the bank circuit signal entry trunks of the switch each including a backward marker trunk through which a marking potential may be supplied to initiate generation of channel pulses on the time division channel of the circuit if the circuit is not already engaged.

5. A switch according to claim 4, in combination with means for passing a marking potential to said backward marker trunk from a bank circuit marker lead, and means responsive to the presence of a signal on the signal exit trunk of the bank circuit for preventing the passage of a marking potential by said passing means.

6. A switching system comprising a number of switches, each according to claim 5, said switches being arranged in ranks, and having links connecting bank circuits of the switches of each rank to selector circuits of the switches of next higher rank, said links being arranged so that there are links extending from each individual switch in each rank to each of the several switches in the next higher rank; the common backward marker lead of each switch of a rank higher than the first rank being connected as the marker lead of bank circuits linked thereto from the preceding rank of switches, whereby a marking potential applied to a called bank circuit of a switch of any rank other than the first will appear on idle bank circuits of first rank switches from which free paths are available to the called bank circuit.

7. A switching system according to claim 6, further comprising means for applying a signal to the signal entry trunk means of a selector circuit of a first rank switch, whereby if a free path exists from said first rank switch to the called bank circuit, the last named signal will initiate time division gating operation of selector circuits of the switches along that path in synchrony with the time division gates of the bank circuits in said path, thereby to establish a communication path through the ranks of switches.

8. A switching system according to claim 7, in which each of the switches of a final rank, i. e., each of the switches terminating in called circuits, have called circuits associated therewith that apply a bank circuit marking potential when the call is answered, so that the marking potential applied for calling the circuit may be discontinued without interrupting communication.

9. A switching system according to claim 7, in which each of the selector side circuits of a first rank switch comprises means including a forward marking test trunk and a forward test gate connected in common thereto for testing whether a connection can be made from a calling circuit at the selector side of said first rank switch to a backwardly marked circuit on the bank side thereof, the common backward marker lead of the first rank switch being connected to control said test gate.

10. A switching system according to claim 9 in which forward marking means is provided for applying a forward test signal to the forward marking test trunk of a calling selector side circuit of a first rank switch, and in which forward mark controlling means is provided for controlling the application of the forward marking signal to the signal entry trunk means of said calling selector side circuit, said forward test gate being connected to control said forward marking means to forwardly mark the calling selector side circuit of the first rank switch when the common backward marker lead of said switch is marked showing that a free path exists through said switch to a free called circuit.

11. A switching system according to claim 9 in which forward marking means is provided for applying a test signal to the forward test trunk of a calling selector side circuit of a first rank switch, and which further comprises time delayed means for signalling the absence of a free path to a called circuit, and means for inhibiting the operation of said time delayed means, said forward test gate being connected to control said operation inhibiting means.

12. A switching system according to claim 7 further comprising an additional switch O1, Figs. 7 and 8; O111, Fig. 1 having bank and selector side circuits like the switches of said number of switches and herein termed a line finder, said line finder switch having calling circuits connected to its bank side Fig. 1 and having its selector side circuits connected to selector side circuits of different first rank switches via bridge circuits BO121, BO122, Fig. 7, each of the bridge circuits connected to the selector side of said line finder O1 comprising means including a bridge transfer test trunk SBO121, Fig. 8 and a transfer test gate T93, T94, W93, W94, Fig. 9 connected in common to said transfer test trunks for testing whether a free path exists from a calling circuit at the bank side of said line finder via any selector side circuit thereof to a backwardly marked circuit on the bank side of a first rank switch, the common backward marker leads of such first rank switches being coupled to control said transfer test gate.

13. A switching system according to claim 12, in which transfer initiating means is provided for initiating transfer of the connection of a calling circuit at the bank side of said line finder from a first selector side circuit thereof from which no free path exists to a called circuit to another selector side circuit thereof from which such a free path does exist, and in which transfer mark controlling means is provided for controlling the application of the transfer signal to said transfer initiating means, said transfer test gate being connected to control said transfer mark controlling means to initiate transfer when any one of the first rank switch common backward marker leads connected thereto is marked showing that a free path exists from said line finder through one of the bridge circuits connected thereto to a free called circuit.

14. A switching system according to claim 13, in which each of the selector side circuits of a first rank switch comprises means including a forward marking test trunk and a forward test gate connected in common thereto for testing whether a connection can be made from a calling circuit at the selector side of said first rank switch to a backwardly marked circuit on the bank side thereof, the common backward marker lead of the first rank switch being connected to control said forward test gate, said forward test gate being connected to inhibit operation of said transfer initiating means by said transfer mark controlling means when a free path does exist from the first selector side circuit of said line finder.

15. A switch according to claim 2, in which the bank circuit signal entry trunks of each bank circuit include a marker trunk through which a marking potential may be applied to initiate generation of channel pulse on the time division channel of the bank circuit, each bank circuit of said switch having associated therewith a marking lead for supplying a marking signal, and means for gating the marking signal to said marking trunk responsive to absence of signal on the signal exit circuit of the bank circuit.

16. A switch according to claim 15, said last named gating means further including mark inhibiting means responsive to absence of a mark designating the associated bank circuit as suitable for receiving a mark, there being a marking source connected to said mark inhibiting means, and said mark inhibiting means being connected to block said last named gating means in absence of a mark from said marking source.

17. A switch according to claim 15, said switch further having associated therewith a marker including means for applying a marker signal to said marking lead, and means connected with said marker signal applying means for delivering a busy signal to the marker in the absence of a mark on the common backward marker lead within a predetermined time after application of the marker signal to the said marking lead.

18. In an automatic telephone exchange line selecting system, in combination; a marker and at least one switch, said switch having at least one set of selector terminals for connection to a speech trunk, a signal trunk and a forward marking trunk and at least one set of bank terminals for connection to a speech trunk and a signal trunk, a marker lead associated with each set of bank terminals, means for signalling the condition free or engaged of the speech trunk connected to each set of bank terminals, means responsive to a mark on a marker lead and to said free or engaged signal for backwardly marking the associated speech trunk when it is signalled to be free and in which each switch is provided with a common backward marker lead and with means for marking the same when at least one speech trunk on the bank side of the switch is marked, said system further including means for marking the marker leads of a group of bank terminals designated by called number signals communicated to the marker.

19. A combination according to claim 18, comprising a plurality of ranks of said switches, with link circuits connecting successive ranks of switches, each link circuit comprising leads connecting the speech and signal trunk terminals of a set of bank terminals of a switch in one rank with the corresponding selector terminals of a switch in the next higher rank, a set of selector terminals in a higher rank switch comprising a test trunk and means for signalling thereon the condition free or engaged of said set of selector terminals, a set of bank terminals of a switch in a preceding rank comprising a backward marking trunk, an electronic valve in said backward marking trunk for marking the same by the transition of the valve from anode current flow to anode current cut-off, or vice versa, and means for controlling said valve comprising a gate circuit interposed between the common backward marker lead of the switch of higher rank and a control element of said electronic valve and connected to the said test trunk, said gate circuit comprising a clamp circuit and means cooperating therewith and responsive to an engaged signal on said test trunk to hold the potential of said control element at a value causing said backward marking trunk to be unmarked.

20. A combination according to claim 18, comprising a plurality of said switches arranged in a plurality of ranks and link circuits comprising leads connecting the speech and signal trunk terminals of a set of bank terminals of a switch in one rank to the corresponding terminals of a set of selector terminals of a switch in the next higher rank; line finder means and incoming circuits each connected to the speech trunk terminals of a set of bank terminals of said line finder means; bridge circuits connecting the selector side terminals of said line finder means to the selector side terminals of the switches of a first rank; outgoing circuits each connected to the speech trunk terminals of a set of bank terminals of a switch of any rank; a marker lead associated with each set of selector side terminals of the line finder switches, free-bridge signalling means for signalling the condition free or engaged of the bridge circuits connected to said sets of selector side terminals, a backward marking trunk and means responsive to a mark on said marker lead and to a free-bridge signal of said free-bridge signalling means for marking said backward marking trunk; a gate circuit individual to a line finder switch and having two input connections, means for communicating to one of said input connections the forward mark on any circuit connected to the selector side of the line finder means, means for communicating to the other one of said input connections the mark on the backward marking trunk of any circuit connected to the selector side of the line finder means, and means for signalling that a free path exists from a calling circuit on the bank side of the line finder means to a free called outgoing circuit when the gate circuit is marked over both said input connections.

21. A combination according to claim 18, comprising a plurality of said switches arranged in a plurality of ranks and link circuits connecting the speech and signal trunk terminals of a set of bank terminals of a switch in one rank to the corresponding terminals of a set of selector terminals of a switch in the next higher rank; said set of bank terminals comprising a backward marking trunk and said set of selector terminals comprising a test trunk for signalling the free or engaged condition of said selector, and a gate circuit for controlling the backward marking of said backward marking trunk comprising a valve means connected to said backward marking trunk, said valve means having conductive and non-conductive states and marking said backward marking trunk in one of said states, said valve means comprising a control electrode biasable for controlling the state of said valve, and said gate circuit further comprising a resistance network having inputs connected to the test trunk of said set of selector terminals and to the common backward marker lead of the switch containing said set of selector terminals and having its output connected to said control element and biasing the same to permit said valve to mark said backward marking trunk on concurrence of a mark on said common backward marker lead and a selector free signal on said test trunk.

22. A combination according to claim 21, said resistance network comprising means for delaying the application of the mark permitting bias to the control electrode of said valve means on the transition of said test trunk from a selector-engaged to a selector-free signalling condition while said common backward marker lead is marked.

23. A system according to claim 18, further comprising a bridge circuit for communicating called number signals received thereby to the marker, said marker and bridge circuit further comprising means for communicating a mark to said forward marking trunk.

24. A combination according to claim 18, comprising, in addition to the marker leads individually associated with each set of bank terminals, further "suitable circuit" marker leads associated with respective sets of bank terminals of a switch, said backward marking means being responsive to a mark on said common backward marker lead and to said free or engaged signal under control of said suitable circuit marker leads.

25. A combination according to claim 18, comprising a plurality of switches arranged in ranks, a gate circuit associated with the selector side of a first rank switch, said gate circuit having at least two input connections, means for communicating to one of said input connections a mark on any forwardly marked trunk on the selector side of the first rank switch, means for communicating to the other of said input connections a mark on the common backward marker lead of the first rank switch, and means for signalling the existence of a free path from said forwardly marked trunk to a marked bank side circuit when said gate circuit is marked on both said input connections.

26. A combination according to claim 25, in which the mark on the forward marking trunk communicated to one of the input connections of the gate circuit is an A. C. signal, said gate circuit comprising means for transmitting said A. C. signal to the marker as a free path signal when its other input is marked by said common backward marker lead, and said marker comprising means for deriving from said free-path signal a connecting signal, and for transmitting said connecting signal to the calling circuit.

27. A combination according to claim 25, further comprising link-circuit-busy signalling means, said busy signal means including time delay means and being connected to said common backward marker lead and to said free-path signalling means, said busy signal means producing a link-circuit-busy signal a predetermined time after being marked only by said common backward marker lead but being inoperative to produce such link-busy-signal if marked by said free-path signal before the expiration of said predetermined time.

28. A combination according to claim 18, further including no-such-number signalling means, said signalling means including time delay means and being put into operation by said marker on receipt of called number signals thereby, said signalling means comprising means for marking the leads of service circuits after such time delay and including means responsive to the marking of a group of circuits designated by the called number signals within said interval of time delay to suspend the operation of the service circuit marking means, one of said service circuits when marked being connected to the calling circuit by said switch and comprising means for signalling to said calling circuit that the called number signals designate a non-existent group of circuits.

29. A combination according to claim 18, said switch comprising a plurality of sets of selector terminals, a plurality of sets of bank terminals and a plurality of selectors connected each to one of said sets of selector terminals; each set of selector terminals having connected thereto a circuit comprising a forward speech trunk, a forward signal trunk and a forward marking trunk, which forward marking trunk is connected to the forward signal trunk of the circuit; each set of bank terminals having a marker lead and a gate circuit therefor controlled by means for signalling the condition free or engaged thereof as aforesaid; each selector comprising pulse generator means to which its marking trunk terminal is connected; said switch comprising a common marking channel and said pulse generator means supplying to said common marking channel a pulse for any marking trunk which is marked, with the impulses of said pulse coincident in time with the channel impulses of bank circuit trunks with which a marked marker lead is associated, said common marking channel being connected to the common backward marker lead of the switch.

30. A combination according to claim 29, said common marking channel being connected to said pulse generator and applying thereto the channel pulse of a marked bank circuit, and said pulse generator being put into operation by concurrent application of such channel pulse and a forward mark over said forward marking trunk to generate a pulse coincident with such channel pulse.

31. A combination according to claim 30, said common marking channel and said forward marking trunk being connected to said pulse generator through a gate circuit, and said gate circuit being operable thereby only when said pulse generator is not operating.

32. A combination according to claim 31, said pulse generator having a test trunk connected thereto and supplying over said test trunk an engaged signal while it is generating a selector pulse, and a free signal while it is not generating a selector pulse; and a selector side backward marking gate to which said test trunk and said common backward marker lead are connected.

33. A combination according to claim 18, said switch comprising a plurality of sets of selector terminals, a plurality of sets of bank terminals, and a plurality of selectors connected each to one of said sets of selector terminals; each set of bank terminals having a marker lead and a gate circuit therefor controlled by means for signalling the condition free or engaged thereof as aforesaid; time division multiplexing gate means connecting said bank terminals on different times division multiplex channels to common speech and signal and marking channels in said switch; said selectors each comprising time division modulating means connecting its set of selector terminals to said common channels; and each selector comprising pulse generating means for operating its time division modulating means in coincidence with a selected one of said time division multiplex channels.

34. A combination according to claim 18, including at least two ranks of said switches, incoming circuits each connected to a set of selector terminals of a first rank switch, outgoing circuits each connected to a set of bank terminals of a switch of any rank, and link circuits connecting successive ranks of switches, said link circuits each connecting the speech and signal trunks of sets of bank terminals of a switch in one rank with the corresponding trunks of sets of selector terminals in different switches in the next higher rank, and means controlled by the marking of the common backward marker leads of the switches for connecting the circuits of a marked group of outgoing circuits to any set of bank terminals of any switch in any preceding rank of switches that has a free path thereto through the intervening switches and link circuits.

35. A combination according to claim 34, further comprising means responsive to the presence of a forward mark on the marking trunk of an incoming circuit seeking connection with a circuit of said designated group of outgoing circuits, and to the backward marking of a free path between said incoming circuit and said marked group of outgoing circuits for establishing communication between said incoming and outgoing circuits via said free path.

36. A combination according to claim 35, further comprising "suitable circuit" marker leads associated with respective sets of bank terminals of the switches, and controlling by their marked or unmarked condition the backward marking of free paths through the ranks of switches and link circuits, whereby said communication may be established only over a free path marked as suitable therefor.

37. A combination according to claim 35, including a first rank switch, a gate circuit having at least two input connections, means for communicating to said input connections, respectively, the mark on any forwardly marked trunk on the selector side of the first rank switch and the mark on the common backward marker lead of the first rank switch, means for signalling that a free path exists between the marked incoming and outgoing circuits when the gate is marked over both input connections, and fault signalling means comprising time delay means put into operation when both said inputs are marked, said fault signalling means comprising means for signalling the existence of a fault after such time delay, and including means responsive to the establishment of communication through the marked free path within said interval of time delay for suspending operation of said fault signalling means.

References Cited in the file of this patent

UNITED STATES PATENTS

| | | |
|---|---|---|
| 2,387,018 | Hartley | Oct. 16, 1945 |
| 2,506,613 | Ransom | May 9, 1950 |
| 2,533,342 | Avery | Dec. 12, 1950 |
| 2,541,932 | Melhose | Feb. 13, 1951 |
| 2,582,959 | Bruce | Jan. 22, 1952 |
| 2,584,987 | Deloraine | Feb. 12, 1952 |
| 2,596,989 | Deloraine | May 20, 1952 |
| 2,619,548 | Lesti | Nov. 25, 1952 |
| 2,638,505 | Van Mierlo | May 12, 1953 |
| 2,649,505 | Ransom et al. | Aug. 18, 1953 |
| 2,664,467 | Den Hertog | Dec. 29, 1953 |

FOREIGN PATENTS

| | | |
|---|---|---|
| 466,986 | Great Britain | June 9, 1937 |